United States Patent
Katta

(10) Patent No.: US 11,215,587 B2
(45) Date of Patent: Jan. 4, 2022

(54) SENSOR DEVICE AND DETECTING METHOD EMPLOYING SAME

(71) Applicant: KYOCERA CORPORATION, Kyoto (JP)

(72) Inventor: Hiroshi Katta, Kashihara (JP)

(73) Assignee: KYOCERA CORPORATION, Kyoto (JP)

( * ) Notice: Subject to any disclaimer, the term of this patent is extended or adjusted under 35 U.S.C. 154(b) by 448 days.

(21) Appl. No.: 16/328,649

(22) PCT Filed: Aug. 31, 2017

(86) PCT No.: PCT/JP2017/031497
§ 371 (c)(1),
(2) Date: Feb. 26, 2019

(87) PCT Pub. No.: WO2018/043686
PCT Pub. Date: Mar. 8, 2018

(65) Prior Publication Data
US 2021/0285916 A1  Sep. 16, 2021

(30) Foreign Application Priority Data
Aug. 31, 2016 (JP) .............................. JP2016-169834

(51) Int. Cl.
*G01N 29/22* (2006.01)
*G01N 29/02* (2006.01)

(52) U.S. Cl.
CPC ........... *G01N 29/222* (2013.01); *G01N 29/02* (2013.01)

(58) Field of Classification Search
CPC ........................... G01N 29/222; G01N 29/02
USPC .......................................................... 73/64.53
See application file for complete search history.

(56) References Cited

FOREIGN PATENT DOCUMENTS

| JP | 2009-031118 A | | 2/2009 |
|---|---|---|---|
| JP | 2009031118 A | * | 2/2009 |
| JP | 5415253 B2 | | 2/2014 |

* cited by examiner

Primary Examiner — Tarun Sinha
(74) Attorney, Agent, or Firm — Duane Morris LLP

(57) ABSTRACT

There are provided a sensor device and a detecting method employing the same, with which it is possible to carry out measurement using a simple operation and to reduce damage. A sensor device includes a liquid sample sensor and a reader in which the liquid sample sensor is detachably mounted. The liquid sample sensor includes a sensor main body including a first face, a sensor element located in the sensor main body, and a plurality of external terminals located on the first face of the sensor main body. Four external terminals are each located at corresponding one of four corners of the rectangular shaped first face, and a pattern of placement of the four external terminals exhibits two-fold rotational symmetry.

20 Claims, 33 Drawing Sheets

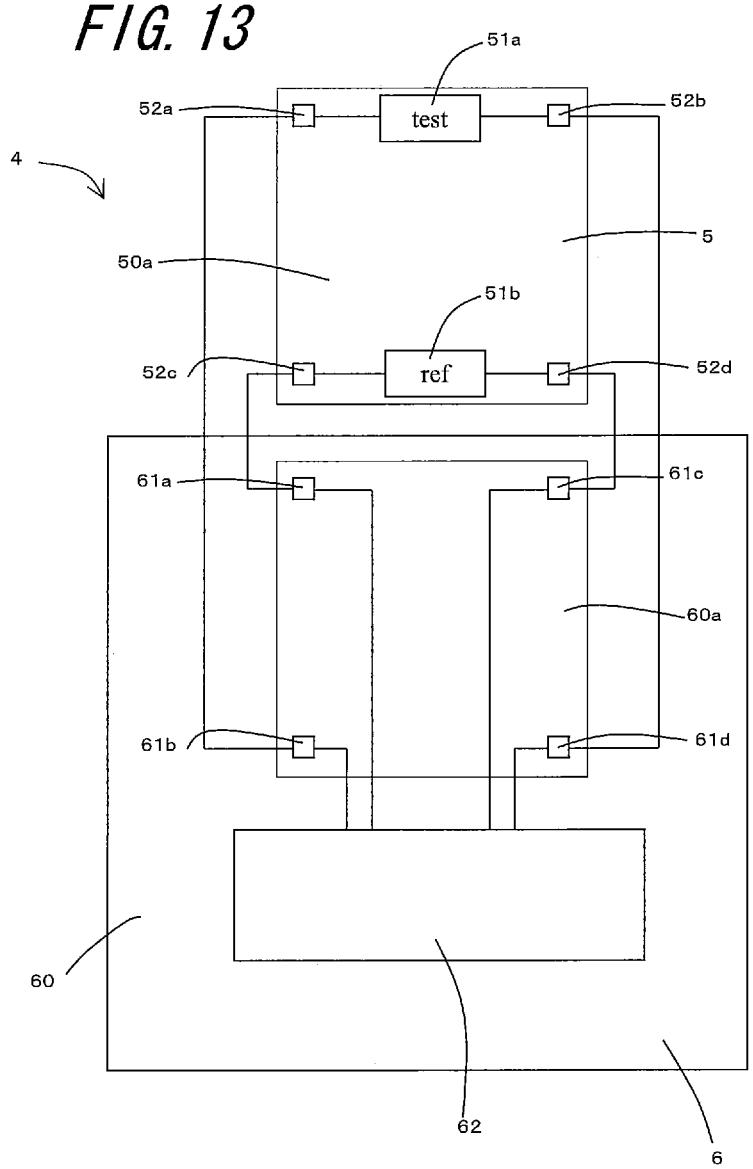

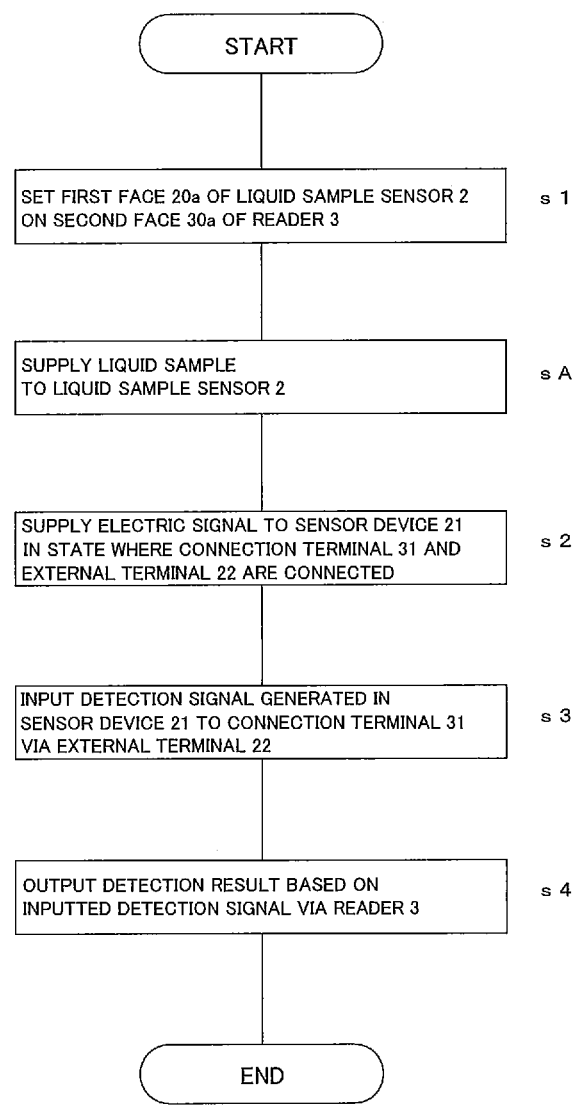

SENSOR DEVICE AND DETECTING METHOD EMPLOYING SAME

CROSS-REFERENCE TO RELATED APPLICATIONS

This application is a national stage entry according to 35 U.S.C. 371 of PCT Application No. PCT/JP2017/031497 filed on Aug. 31, 2017, which claims priority to Japanese Application No. 2016-169834 filed on Aug. 31, 2016, which are entirely incorporated herein by reference.

TECHNICAL FIELD

The present invention relates to a sensor device capable of measurement of the properties or constituents of a sample in liquid form, and a detecting method employing the same.

BACKGROUND

There is a heretofore known sensor device in which a sample in liquid form is supplied to a cartridge and the properties of the sample in liquid form or the constituents contained in the sample are measured.

In the device described in Japanese Patent Publication JP-B2 5415253, there is provided a positioning member, which is complementary to a microfluid cartridge, for setting the microfluid cartridge in a certain oriented position in the device.

SUMMARY

A sensor device in accordance with one embodiment of the invention includes a sensor and a measurement portion in which the sensor is detachably mounted. The sensor includes a sensor main body including a first face, a sensor element located in the sensor main body, and a plurality of external terminals located on the first face so as to be electrically connected to the sensor element. The measurement portion includes a measurement portion main body including a second face opposed to the first face, and a plurality of connection terminals located on the second face. At least one of a pattern of placement of the plurality of external terminals and a pattern of placement of the plurality of connection terminals exhibits rotational symmetry. At least one of the plurality of external terminals can be electrically connected to corresponding one of the plurality of connection terminals in any one of a first arrangement in which the sensor is set in a predetermined oriented position with respect to the measurement portion and a second arrangement in which the sensor is set in another oriented position to which it has been shifted, after a rotation about a rotation center of rotational symmetry, from the predetermined oriented position corresponding to the first arrangement.

A detecting method in accordance with one embodiment of the invention is carried out by a sensor device comprising a sensor and a measurement portion in which the sensor is detachably mounted. In a first step, a first face of the sensor is set on a second face of the measurement portion for supporting the first face. In a second step, an electric signal is supplied to the sensor element under conditions where at least one of a pattern of placement of connection terminals located at the second face and a pattern of placement of external terminals located on the first face so as to be electrically connected to the corresponding connection terminals exhibits rotational symmetry, and electrical connection is established between the connection terminals and the external terminals. In a third step, a detection signal produced in the sensor element in response to the supplied electric signal is inputted, via an external terminal disposed on the first face, to a connection terminal disposed on the second face so as to be electrically connected to the external terminal. In a fourth step, a detection result based on the inputted detection signal is outputted. During the interval when the second step, the third step, and the fourth step are being performed continuously, a liquid sample is supplied to the sensor element of the sensor.

BRIEF DESCRIPTION OF DRAWINGS

FIG. 13 is a schematic block diagram showing the sensor device 4 in the second arrangement;

FIG. 24 is a flow chart showing procedures in a detecting method in accordance with a fifth embodiment of the invention.

DETAILED DESCRIPTION

Figure 1:
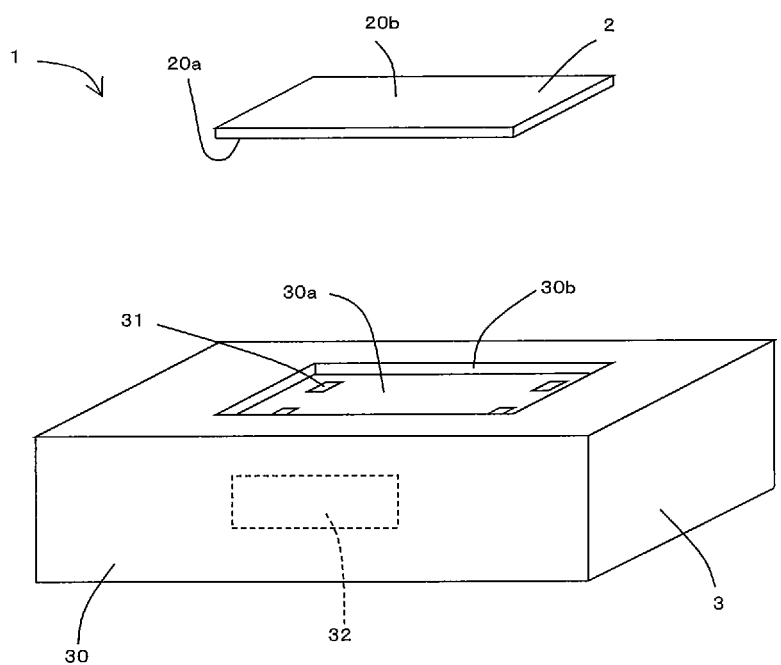
FIG. 1 is a schematic view showing the structure of a sensor device 1 in accordance with a first embodiment of the invention.

The following describes the details of embodiments of a sensor device pursuant to the invention with reference to drawings. Throughout the drawings to be hereafter referred to, like reference numerals or symbols designate corresponding or identical constituent components. Moreover, in each drawing, constituent components are schematically illustrated, and thus there may be cases where the size of each component, the distance between the individual components, etc. differs from an actual value. In the following description, a sensor is exemplified by a liquid sample sensor which carries out sensing operation using a sample in liquid form, and, a measurement portion is exemplified by a reader built as a device including various constituent elements.

First Embodiment

Figure 2A:
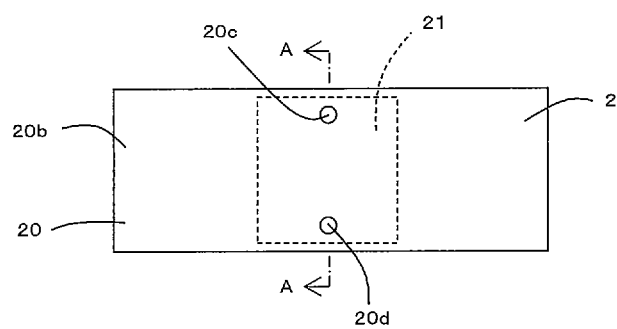
FIG. 2A is a plan view showing the appearance of a liquid sample sensor 2.
Figure 2B:
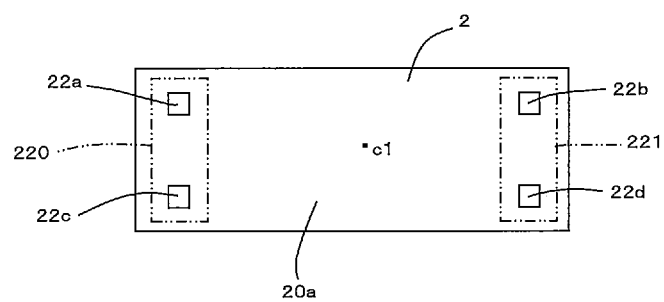
FIG. 2B is a bottom view showing the appearance of the liquid sample sensor 2.

FIG. 1 is a schematic drawing showing the structure of a sensor device 1 in accordance with a first embodiment of the invention. FIGS. 2A and 2B are external views showing the configuration of a liquid sample sensor 2. FIG. 2A is a plan view, and FIG. 2B is a bottom view. The sensor device 1 includes the liquid sample sensor 2 serving as a sensor and a reader 3 serving as a measurement portion in which the liquid sample sensor 2 is detachably mounted. The liquid sample sensor 2 at least absorbs or receives a liquid sample, causes an electric signal supplied from the reader 3 to vary according to the properties or constituent components of the liquid sample, and, and outputs the varied electric signal to the reader 3. The reader 3 supplies an electric signal to the liquid sample sensor 2, and also receives an electric signal outputted from the liquid sample sensor 2. For example, the liquid sample sensor 2 is made as a disposable cartridge. The used liquid sample sensor 2 is replaced with a new liquid sample sensor 2 which is to be set in the reader 3 for the succeeding liquid sample sensing operation.

The liquid sample sensor 2 includes a sensor main body 20 including a first face 20a, a sensor element 21 located in the sensor main body 20, and a plurality of external terminals 22 located on the first face 20a of the sensor main body 20. The external terminals 22 are electrically connected to the sensor element 21. The reader 3 includes a reader main body 30 including a second face 30a opposed to the first face 20a of the liquid sample sensor 2, a plurality of connection terminals 31 positioned so as to correspond one-to-one to the plurality of external terminals 22, and a control section 32 which is electrically connected to the plurality of connection terminals 31, and which carries out inputting and outputting electric signals.

In the present embodiment, the sensor main body 20 is shaped in a plate. One of the flat surfaces of the sensor main body 20 which are perpendicular to the thickness direction is defined as the first face 20a, and the other flat surface is defined as a third face 20b. The first face 20a is provided with the external terminals 22, and, the third face 20b is provided with an inlet 20c for introduction of a liquid sample and an outlet 20d for discharge of a liquid sample. After being supplied to the sensor main body 20 through the inlet 20c, a liquid sample is subjected to detection process in the sensor element 21 located in the sensor main body 20, and, following the completion of detection, the liquid sample is discharged from the outlet 20d. Note that the detected liquid sample may be stored in the sensor main body 20 instead, so that it can be discarded together with the used liquid sample sensor 2. In this case, only the inlet 20c needs to be provided, and the outlet 20d may thus be omitted from the construction. Moreover, instead of the outlet 20d, a discharge orifice may be provided to discharge air present within the sensor main body 20 upon the supply of a liquid sample into the sensor main body 20 through the inlet 20c.

Figure 3:
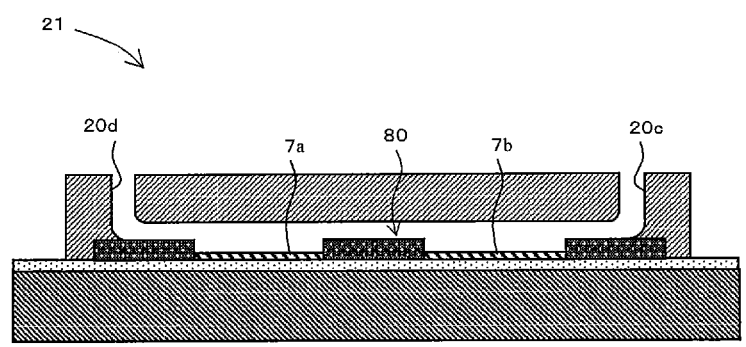
FIG. 3 is a sectional view of the liquid sample sensor 2 taken along the line A-A in FIG. 2A.

FIG. 3 is a sectional view of the liquid sample sensor 2 taken along the line A-A in FIG. 2A. For example, the sensor element 21 has a metallic film 7a with a reactant immobilized thereon for reaction with an object to be detected. The selection of the reactant may be predicated upon the type of an object to be detected, viz., a detection object. For example, where a detection object is a specific cell or living tissue in a liquid sample, an antibody, and an aptamer made of nucleic acid and peptide may be used as the reactant. In the present embodiment, as a form of reaction between the reactant and the detection object, for example, the reactant and the detection object may be bound to each other under chemical reaction or antigen-antibody reaction. The form of reaction is not so limited, and thus, the detection object may be bound to or adsorbed on the reactant under interaction between the detection object and the reactant. Upon the contact of the sample with the metallic film 7a, in the presence of the reactant, a characteristic of a signal transmitted from a signal-transmitting electrode such as an IDT (InterDigital Transducer) electrode as later described varies according to the type or content of the detection object. The signal having the varied characteristic is received as a detection signal by a signal-receiving electrode such as an IDT electrode. On the basis of the variation of the characteristic, for example, a mass corresponding to an increase of the detection object contained in the sample can be detected. The signal characteristic employed may be any given characteristic which varies with a change in the mass of the metallic film 7a without specific limitation. For example, where the signal is of elastic wave signals, the phase of the signal may be employed as the signal characteristic to be varied.

In addition, there is provided a metallic film 7b which serves as a reference for the metallic film 7a. The metallic film 7b is free of immobilization of a substance such as an aptamer that is bound to and reacts with the detection object. Moreover, the metallic film 7b may be subjected to surface treatment to lower the extent of its bindability or reactivity to the liquid sample for purposes of stabilization. A signal-transmitting electrode and a signal-receiving electrode such as IDT electrodes are provided also for the metallic film 7b. A signal transmitted from the signal-transmitting electrode passes through the metallic film 7b so as to become a reference signal which is received by the signal-receiving electrode. In the sensor main body 20 is formed a flow channel 80 extending from the inlet 20c to the outlet 20d to bring the liquid sample introduced in the sensor main body 20 from the inlet 20c into contact with the metallic film 7a and the metallic film 7b.

Figure 4:
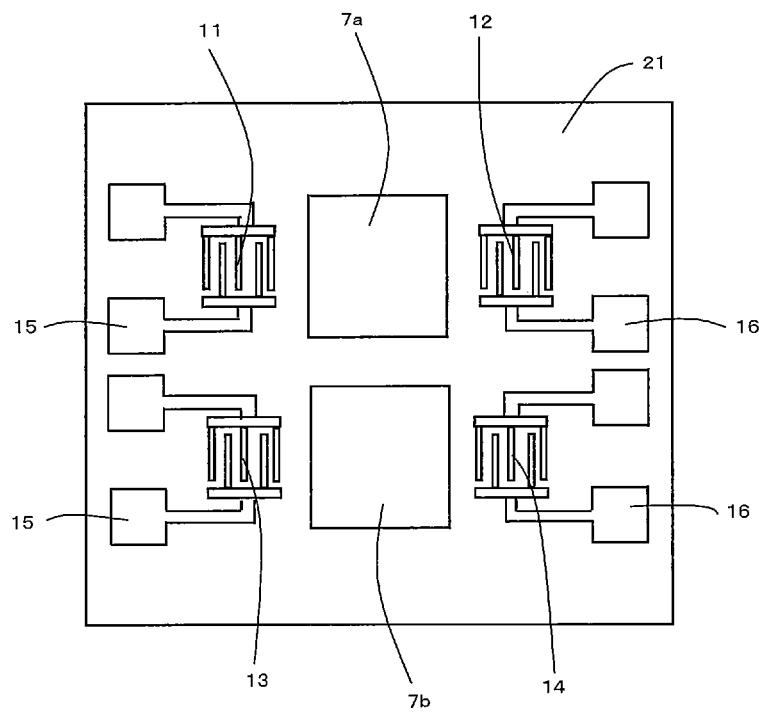
FIG. 4 is a plan view of the sensor element 21.

FIG. 4 is a plan view of the sensor element 21. The sensor element 21 includes a detection section and a reference section. The detection section includes a first IDT electrode 11 which generates an elastic wave which propagates toward the metallic film 7a and a second IDT electrode 12 which receives the elastic wave which has passed through the metallic film 7a, and, the reference section includes a first IDT electrode 13 which generates an elastic wave which propagates toward the metallic film 7b and a second IDT electrode 14 which receives the elastic wave which has passed through the metallic film 7b. The first IDT electrode 11 and the first IDT electrode 13 are each connected to a pair of first draw-out electrodes 15, and the second IDT electrode 12 and the second IDT electrode 14 are each connected to a pair of second draw-out electrodes 16. One of the pair of first draw-out electrodes 15 and one of the pair of second draw-out electrodes 16 are each connected to the plurality of connection terminals 31 of the reader 3. The other one of the pair of first draw-out electrodes 15 and the other one of the pair of second draw-out electrodes 16 are disposed so that they can be connected to the ground (earth) electrode of the reader 3 even if any one of a first arrangement and a second arrangement is taken up as will hereafter be described.

The first face 20a of the liquid sample sensor 2 is provided with a plurality of external terminals 22 which are electrically connected to a plurality of connection terminals 31 located in the reader 3. In the present embodiment, the plurality of external terminals 22 are located on the first face 20a so as to exhibit rotational symmetry. While the present embodiment will be described with respect to the case where the liquid sample sensor 2 includes four external terminals as the plurality of external terminals 22, the number of the external terminals 22 is not limited to a specific value, and may thus be determined in conformity with input and output numbers for the sensor element 21, for example.

In the liquid sample sensor 2 shown in FIGS. 2A and 2B by way of example, the first face 20a and the third face 20b have the same quadrangular (rectangular) shape. There are provided four external terminals 22a, 22b, 22c, and 22d each located at corresponding one of the four corners of the first face 20a. Each external terminal 22 has a square shape. The external terminals 22 do not necessarily have to have the same shape, and may thus be made to have different shapes. The pattern of placement of these four external terminals 22a, 22b, 22c, and 22d exhibits two-fold rotational symmetry. In the liquid sample sensor 2 of the present embodiment, the centroid of a rectangle whose four vertices coincide with the centers of the four external terminals 22a, 22b, 22c, and 22d, respectively, defines the rotation center c1 of rotational symmetry. The pattern of placement of the four external terminals 22a, 22b, 22c, and 22d exhibits two-fold rotational symmetry, and thus, even after a 180° rotation of the liquid sample sensor about the rotation center c1, the pattern of terminal placement remains the same.

In the reader 3 of the present embodiment, just like the first face 20a of the liquid sample sensor 2, the second face 30a opposed to the first face 20a has a rectangular shape. The second face 30a defines the bottom of a recess formed in the surface of the reader main body 30. An inner periphery 30b of the recess extends along the outer periphery of the second face 30a serving as the recess bottom, and also extends substantially vertically from the second face 30a. Just like the second face 30a, the opening of the recess has a rectangular shape. Moreover, the second face 30a is provided with a plurality of connection terminals 31 each disposed so as to make electrical connection with corresponding one of the external terminals 22 of the liquid sample sensor 2. In the present embodiment, the connection terminals 31 correspond in number with the external terminals, that is; there are provided four connection terminals 31 which are connected to the four external terminals 22a, 22b, 22c, and 22d, respectively. Just like the four external terminals 22a, 22b, 22c, and 22d, the four connection terminals are arranged so as to exhibit two-fold rotational symmetry.

To carry out measurement, the liquid sample sensor 2 is set in the reader 3. In the present embodiment, the setting of the liquid sample sensor 2 in the reader 3 may be taken to mean the establishment of electrical connection between the external terminal 22 of the liquid sample sensor 2 and the connection terminal of the reader 3. For example, the liquid sample sensor 2 may be mounted so as to lie on the surface of the reader 3. In the liquid sample sensor 2 of the present embodiment, as described above, the external terminals 22 are arranged so as to exhibit two-fold rotational symmetry. The electrical connection between the external terminal 22 of the liquid sample sensor 2 and the connection terminal of the reader 3 can be established not only when the liquid sample sensor 2 is set in an oriented position to permit electrical connection between the external terminal 22 of the liquid sample sensor 2 and the connection terminal of the reader 3 (first arrangement), but also when the liquid sample sensor 2 is set in another oriented position to which it has been shifted after a rotation of 180° about the rotation center c1 (second arrangement).

In user's work to set the liquid sample sensor 2 in the reader 3 to carry out measurement, the liquid sample sensor 3 can be set in any one of two oriented positions corresponding to the first arrangement and the second arrangement, respectively, that is; measurement can be carried out both in the first arrangement and in the second arrangement. This makes it possible to reduce time and effort imposed on the work in preparation for measurement such as the trouble of having to set the liquid sample sensor 2 in a correct oriented position, and thereby enable the user to carry out measurement by simple operation without any regard to the orientation of the liquid sample sensor 2.

Moreover, in the present embodiment, at the time of mounting the liquid sample sensor 2 having a rectangular plate-like outside shape so that the first face 20a can be located on the second face 30a of the reader 3, the liquid sample sensor 2 is guidedly introduced into the opening having a rectangular outside shape, whereupon the first face 20a and the second face 30a are disposed so as to face each other as viewed in the plan view. In consequence, each of the four external terminals 22a, 22b, 22c, and 22d of the first face 20a abuts against corresponding one of the four connection terminals of the second face 30a, thus assuring electrical connection between the external terminal and the connection terminal. By virtue of the recess formed in the main body of the reader 3 as a guide to guide the liquid sample sensor 2, the user can carry out measurement with greater ease in operation without any regard not only to the orientation of the liquid sample sensor 2 but also to the location of the terminal.

Figure 5:
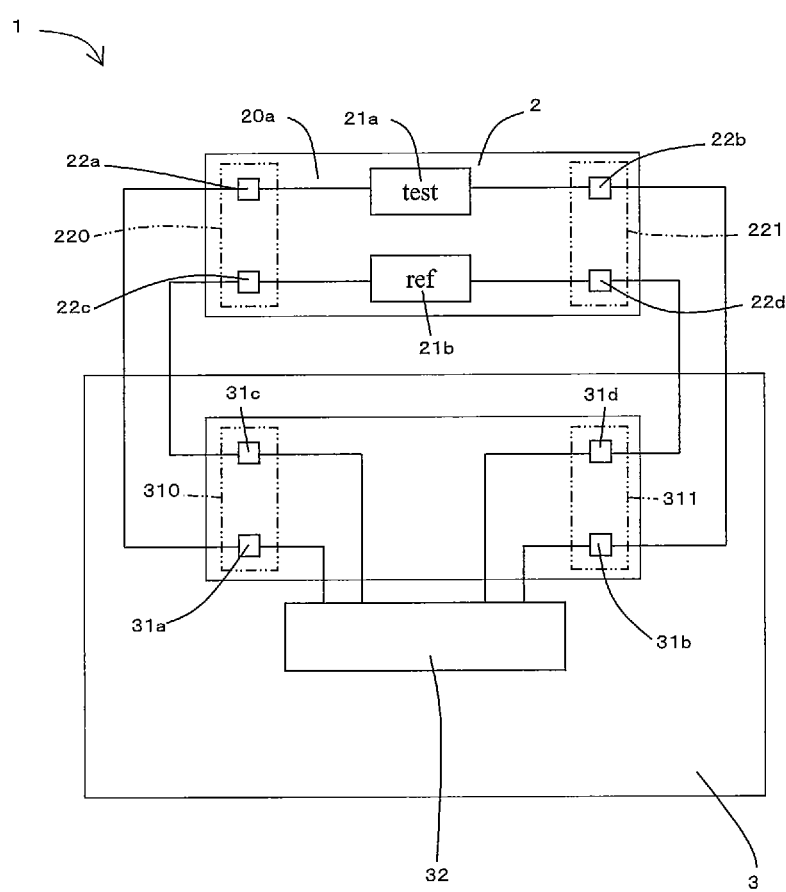
FIG. 5 is a schematic block diagram showing the sensor device 1 in a first arrangement.
Figure 6:
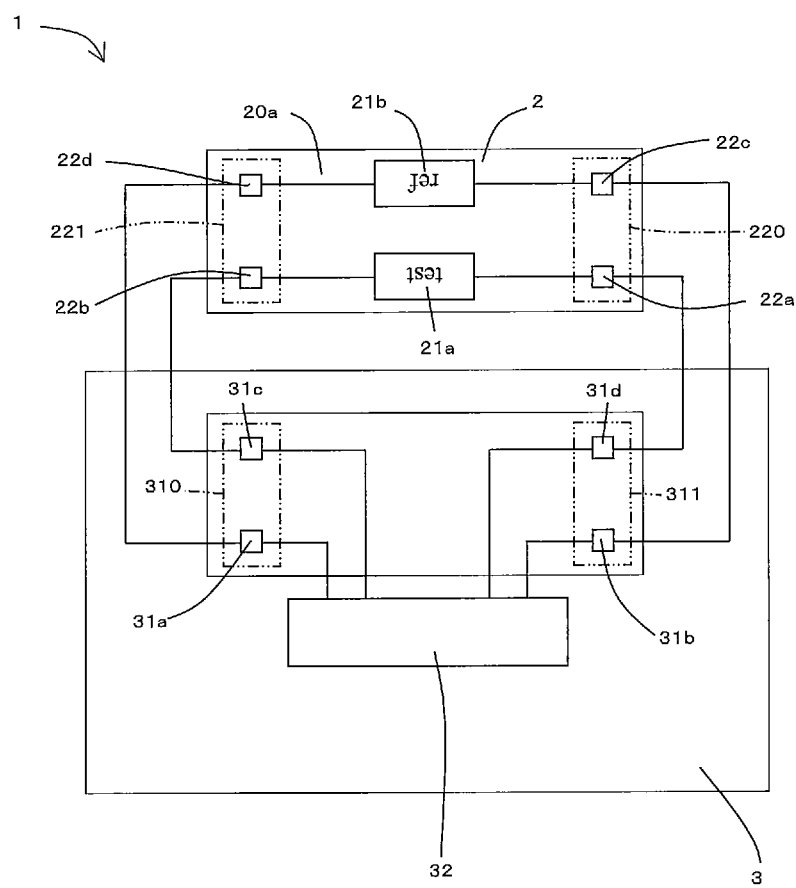
FIG. 6 is a schematic block diagram showing the sensor device 1 in a second arrangement.

FIG. 5 is a schematic block diagram showing the sensor device 1 in the first arrangement, and FIG. 6 is a schematic block diagram showing the sensor device 1 in the second arrangement. As described above, there is a 180° difference in the orientation of the liquid sample sensor 2 set in the reader 3 between the first arrangement and the second arrangement. Accordingly, each external terminal of the liquid sample sensor 2 makes electrical connection with a different connection terminal 31 of the reader 3 with a change from the first arrangement to the second arrangement and vice versa.

For example, in the first arrangement shown in FIG. 5, the external terminal and the connection terminal are connected as follows. The first external terminal 22*a* of the liquid sample sensor 2 is electrically connected to the first connection terminal 31*a* of the reader 3. The second external terminal 22*b* of the liquid sample sensor 2 is electrically connected to the second connection terminal 31*b* of the reader 3. The third external terminal 22*c* of the liquid sample sensor 2 is electrically connected to the third connection terminal 31*c* of the reader 3. The fourth external terminal 22*d* of the liquid sample sensor 2 is electrically connected to the fourth connection terminal 31*d* of the reader 3.

The first external terminal 22*a* and the second external terminal 22*b* of the liquid sample sensor 2 are electrically connected to a detection section 21*a* which produces a detection signal for detection of a detection object contained in a sample in the sensor element 21. Moreover, the third external terminal 22*c* and the fourth external terminal 22*d* of the liquid sample sensor 2 are electrically connected to a reference section 21*b* which produces a reference signal which serves as a reference for the detection signal in the sensor element 21. Each of the first external terminal 22*a*, the second external terminal 22*b*, the third external terminal 22*c*, and the fourth external terminal 22*d* serves as both of an input terminal which receives an electric signal input and an output terminal which produces an electric signal output. In the first arrangement, each of the first external terminal 22*a* and the third external terminal 22*c* receives an electric signal input from the reader 3, and, in the second arrangement, each of them constitutes a first external terminal group 220 which gives an electric signal output to the reader 3. In the first arrangement, each of the second external terminal 22*b* and the fourth external terminal 22*d* gives an electric signal output to the reader 3, and, in the second arrangement, each of them constitutes a second external terminal group 221 which receives an electric signal input from the reader 3.

In the reader 3, the control section 32 inputs an electric signal to the first connection terminal 31*a* and the third connection terminal 31*c*, which constitute a first connection terminal group 310, and supplies the electric signal to the liquid sample sensor 2. Moreover, the control section 32 receives an electric signal (including a detection signal and a reference signal) outputted from the liquid sample sensor 2 by the second connection terminal 31*b* and the fourth connection terminal 31*d* which constitute a second connection terminal group 311.

In the first arrangement shown in FIG. 5, the electrical connection between the first connection terminal 31*a* of the reader 3 and the first external terminal 22*a* of the liquid sample sensor 2 permits the supply of electric signals from the reader 3 to the detection section 21*a* of the liquid sample sensor 2. The electrical connection between the second connection terminal 31*b* of the reader 3 and the second external terminal 22*b* of the liquid sample sensor 2 enables the reader 3 to receive a detection signal produced in the detection section 21*a*. Moreover, the electrical connection between the third connection terminal 31*c* of the reader 3 and the third external terminal 22*c* of the liquid sample sensor 2 permits the supply of electric signals from the reader 3 to the reference section 21*b* of the liquid sample sensor 2. The electrical connection between the fourth connection terminal 31*d* of the reader 3 and the fourth external terminal 22*d* of the liquid sample sensor 2 enables the reader 3 to receive a reference signal produced in the reference section 21*b*. The reader 3 produces the result of detection of a detection object based on the detection signal and the reference signal received.

In the second arrangement shown in FIG. 6, the external terminal and the connection terminal are connected as follows. The first external terminal 22*a* of the liquid sample sensor 2 is electrically connected to the fourth connection terminal 31*d* of the reader 3. The second external terminal 22*b* of the liquid sample sensor 2 is electrically connected to the third connection terminal 31*c* of the reader 3. The third external terminal 22*c* of the liquid sample sensor 2 is electrically connected to the second connection terminal 31*b* of the reader 3. The fourth external terminal 22*d* of the liquid sample sensor 2 is electrically connected to the first connection terminal 31*a* of the reader 3.

In the second arrangement shown in FIG. 6, the electrical connection between the first connection terminal 31*a* of the reader 3 and the fourth external terminal 22*d* of the liquid sample sensor 2 permits the supply of electric signals from the reader 3 to the reference section 21*b* of the liquid sample sensor 2. The electrical connection between the second connection terminal 31*b* of the reader 3 and the third external terminal 22*c* of the liquid sample sensor 2 enables the reader 3 to receive a reference signal produced in the reference section 21*b*. Moreover, the electrical connection between the third connection terminal 31*c* of the reader 3 and the second external terminal 22*b* of the liquid sample sensor 2 permits the supply of electric signals from the reader 3 to the detection section 21*a* of the liquid sample sensor 2. The electrical connection between the fourth connection terminal 31*d* of the reader 3 and the first external terminal 22*a* of the liquid sample sensor 2 enables the reader 3 to receive a detection signal produced in the detection section 21*a*. In the reader 3, the control section 32 produces the result of detection of a detection object based on the detection signal and the reference signal received.

As distinct from the first arrangement in which the detection signal is received by the second connection terminal 31*b* and the reference signal is received by the fourth connection terminal 31*d*, in the second arrangement, the detection signal is received by the fourth connection terminal 31*d* and the reference signal is received by the second connection terminal 31*b*. The control section 32 determines whether the signal received by the second connection terminal 31*b* is a detection signal or a reference signal, and also determines whether the signal received by the fourth connection terminal 31*d* is a detection signal or a reference signal, prior to the production of a detection result. For example, in the present embodiment, the control section 32 determines which one of the signal received by the second connection terminal 31*b* and the signal received by the fourth connection terminal 31*d* is a reference signal. When one of the received signals is identified as a reference signal, the other can be judged as a detection signal accordingly.

For example, whether the received signal is a reference signal or not is determined by the control section 32 as follows. As a rule, a reference signal exhibits a certain variation tendency (profile) over time regardless of whether a detection object is contained in a sample or not. Examples of the certain variation tendency include the tendency for a signal value to remain unchanged for a predetermined period of time since the onset of signal reception and the tendency for a signal value to increase monotonically for a predetermined period of time since the onset of signal reception. For an understanding of the variation tendency exhibited by a reference signal, it is advisable to record a certain variation tendency of a signal identified as a reference signal, viz., a signal which was found to occur in the reference section 21b, obtained in advance on the basis of signal value variations, etc.

A comparison is carried out between the recorded data of a certain variation tendency and the data of variation tendencies exhibited by signals received by the second connection terminal 31b over a certain time duration, as well as the data of the variation tendencies exhibited by signals received by the fourth connection terminal 31d over a certain time duration. A signal which is found to exhibit the variation tendency coinciding with the recorded certain variation tendency is judged as a reference signal.

Figure 7:
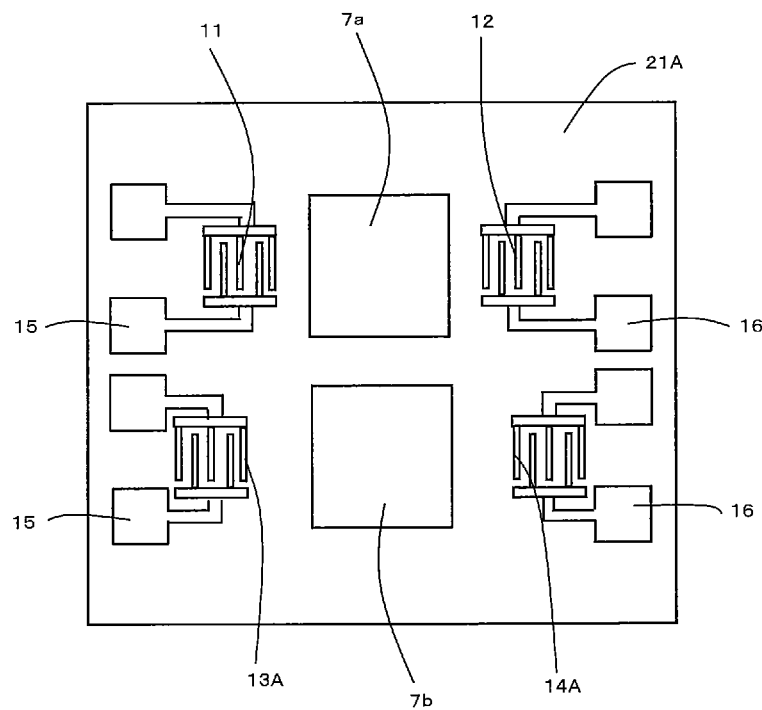
FIG. 7 is a plan view of the sensor element 21A.

For example, whether the received signal is a reference signal or not may alternatively be determined by the control section 32 as follows. In the aforestated case, a certain amount of time is required to obtain the variation tendency of a received signal, and in addition, the possibility may arise that accurate identification cannot be carried out when the variation tendency of a received signal does not coincide with the recorded certain variation tendency. With this in view, as practiced in a sensor element 21A shown in FIG. 7, the layout of IDT electrodes in the reference section may be changed in the interest of accurate identification of a reference signal. As contrasted to the sensor element 21 shown in FIG. 4, in the sensor element 21A shown in FIG. 7, a wider spacing is left between a first IDT electrode 13A which generates an elastic wave which propagates toward the metallic film 7b and a second IDT electrode 14A which receives the elastic wave which has passed through the metallic film 7b. In the earlier described sensor element 21 shown in FIG. 4, the distance between the first IDT electrode 11 which generates an elastic wave which propagates toward the metallic film 7a and the second IDT electrode 12 which receives the elastic wave which has passed through the metallic film 7a in the detection section is equal to the distance between the first IDT electrode 13 and the second IDT electrode 14 in the reference section. In this case, given that the metallic film 7a and the metallic film 7b have the same surface condition (for example, the surface of each metallic film is free of immobilization of a reactant which reacts with a detection object), when electric signals are delivered to the detection section and the reference section prior to the supply of a liquid sample to the sensor element 21, the signal received by the second connection terminal 31b and the signal received by the fourth connection terminal 31d are in phase. On the other hand, in the sensor element 21A shown in FIG. 7, the distance between the first IDT electrode 13A and the second IDT electrode 14A in the reference section is greater than the distance between the first IDT electrode 11 and the second IDT electrode 12 in the detection section. In this constitution, even if the metallic film 7a and the metallic film 7b have the same surface condition, when electric signals are delivered to the detection section and the reference section prior to the supply of a liquid sample to the sensor element 21, the signal received by the second connection terminal 31b and the signal received by the fourth connection terminal 31d are different in phase from each other. Thus, where design adjustment is made to produce a difference in electrode-to-electrode distance between the detection section and the reference section, the phase of a detection signal and the phase of a reference signal are shifted with respect to each other correspondingly. In consequence, on the basis of the result of comparison between the phase of the signal received by the second connection terminal 31b and the phase of the signal received by the fourth connection terminal 31d, a reference signal which has propagated through the reference section can be identified. Meanwhile, as described previously, where the metallic film 7a bears an immobilized reactant which reacts with a detection object, whereas the metallic film 7b is free of immobilization of a reactant which reacts with a detection object, in addition to the above-described distance difference-caused phase difference, the surface condition difference-caused phase difference may be employed for signal detection.

Thus, following the completion of setting of the liquid sample sensor 2 in the reader 3, in advance of measurement, electric signals are delivered from the reader 3 to the liquid sample sensor 2 over a period of time long enough to make sure the phase of the signal received by the second connection terminal 31b and the phase of the signal received by the fourth connection terminal 31d. Identification of a reference signal can be carried out on the basis of the result of comparison between the phase of the signal received by the second connection terminal 31b and the phase of the signal received by the fourth connection terminal 31d. The time duration for phase identification is shorter than the time duration required to obtain the above-described variation tendency, and, identification of a reference signal can be achieved without fail.

Modified Example in First Embodiment

While the liquid sample sensor 2 has been illustrated as being configured so that, of the four external terminals provided therein, one set of two external terminals constitutes the first external terminal group, and the other set of two external terminals constitutes the second external terminal group, and that the first external terminal group and the second external terminal group are opposed to each other with respect to the rotation center c1 lying in between, this design is not intended to be limiting of the present embodiment. The number of the external terminals may be six or eight, or more.

Figure 8A:
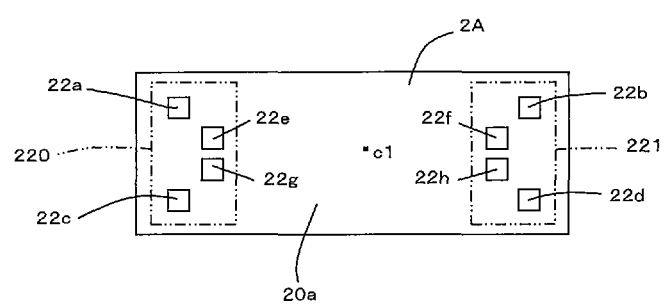
FIG. 8A is a plan view showing the appearance of a modified example of the liquid sample sensor 2.
Figure 8B:
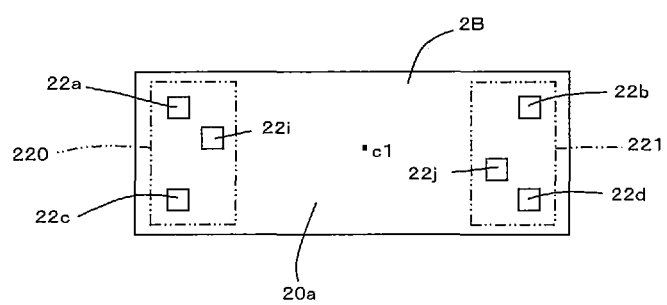
FIG. 8B is a bottom view showing the appearance of a modified example of the liquid sample sensor 2.

FIGS. 8A and 8B are each an external view showing a modified example of the liquid sample sensor 2. In FIGS. 8A and 8B, for a better understanding of the layout of external terminals, there is shown only the appearance of the first face 20a of each of liquid sample sensors 2A and 2B implemented as modified examples. The third face 20b of each of the liquid sample sensors 2A and 2B may be either identical with or different from the third face 20b of the liquid sample sensor 2 shown in FIG. 2A. In the liquid sample sensor 2A shown in FIG. 8A, there are provided eight external terminals 22, that is, in addition to the above-described four external terminals 22a, 22b, 22c, and 22d, there are provided four external terminals 22e, 22f, 22g, and 22h. These eight external terminals 22 are arranged so as to exhibit two-fold rotational symmetry. Of the additional four external terminals 22e, 22f, 22g, and 22h, the external terminals 22e and 22g belong, together with the external terminals 22a and 22c, to the first external terminal group 220, and, the external terminals 22f and 22h belong, together with the external terminals 22b and 22d, to the second external terminal group 221. For example, the four external terminals 22e, 22f, 22g, and 22h are each electrically connected to corresponding one of two additional detection sections or corresponding one of two additional reference sections, or corresponding one of a single additional detection section and a single additional reference section. In the liquid sample sensor 2A, the total number of the detection and reference sections is four. Moreover, in the liquid sample sensor 2 and the liquid sample sensor 2A, the external terminals are line-symmetrically arranged with respect to an axis of symmetry passing through the rotation center c1.

In the liquid sample sensor 2B shown in FIG. 8B, there are provided six external terminals 22, that is, in addition to the above-described four external terminals 22a, 22b, 22c, and 22d, there are provided two external terminals 22i and 22j. These six external terminals 22 are arranged so as to exhibit two-fold rotational symmetry. Of the additional two external terminals 22i and 22j, the external terminal 22i belongs, together with the external terminals 22a and 22c, to the first external terminal group 220, and, the external terminal 22j belongs, together with the external terminals 22b and 22d, to the second external terminal group 221. For example, the two external terminals 22i and 22j are each electrically connected to an additional detection section or an additional reference section. In the liquid sample sensor 2B, the total number of the detection and reference sections is three. As practiced in the liquid sample sensors 2, 2A, and 2B, the external terminals 22 are arranged so as to exhibit rotational symmetry, and so the user can carry out measurement both in the first arrangement and in the second arrangement regardless of the number of terminals. This enables the user to carry out measurement by simple operation with less effort.

Figure 9A:
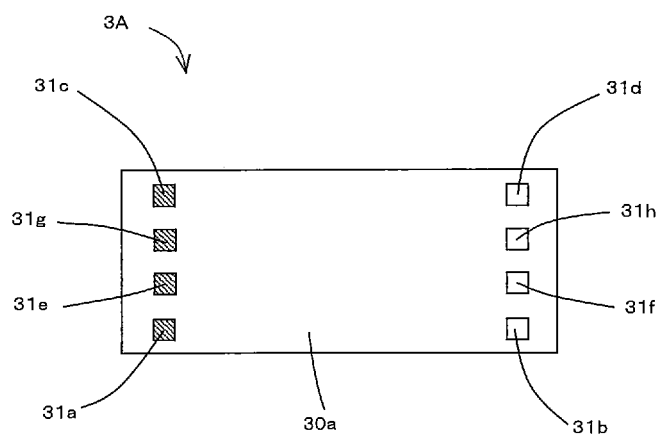
FIG. 9A is a plan view showing the appearance of a modified example of a reader 3.

FIG. 9A is a schematic drawing showing a reader 3A which is a modified example of the reader. In the present modified example, as the plurality of connection terminals 31, for example, eight connection terminals are provided on the second face 30a of the reader 3A. Of the eight connection terminals 31, four connection terminals 31a, 31c, 31e, and 31g are disposed along one of the short sides of the rectangular second face 30a, and the rest, namely four connection terminals 31b, 31d, 31f, and 31h are disposed along the other one of the short sides. These eight connection terminals 31 are arranged so as to exhibit two-fold rotational symmetry. The four connection terminals 31a, 31c, 31e, and 31g disposed along one short side are each intended to feed electric signals to the liquid sample sensor 2, and, the four connection terminals 31b, 31d, 31f, and 31h disposed along the other short side are each intended to receive electric signals (including a detection signal and a reference signal) outputted from the liquid sample sensor 2.

In the present embodiment, in the reader 3A, electric signal-output connection terminals are located on one side of the reader, whereas electric signal-input connection terminals are located on the other side of the reader. This positioning leaves a sufficient spacing between the electric signal-output connection terminal and the electric signal-input connection terminal, with consequent reduction in electromagnetic interference between an outputted electric signal and an inputted electric signal.

Figure 9B:
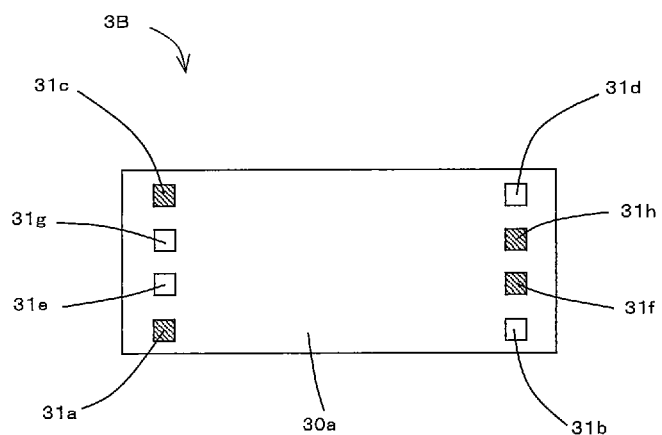
FIG. 9B is a bottom view showing the appearance of a modified example of the reader 3.

FIG. 9B is a schematic drawing showing a modified example of the reader 3. In the present modified example, as a plurality of the connection terminals 31, for example, eight connection terminals are provided on the second face 30a of the reader 3A. Of the eight connection terminals 31, four connection terminals 31a, 31c, 31e, and 31g are disposed along one of the short sides of the rectangular second face 30a, and the rest, namely four connection terminals 31b, 31d, 31f, and 31h are disposed along the other one of the short sides. These eight connection terminals 31 are arranged so as to exhibit two-fold rotational symmetry. The four connection terminals 31a, 31c, 31e, and 31g disposed along one short side are classified as terminals for feeding electric signals to the liquid sample sensor 2 and terminals for receiving electric signals (including a detection signal and a reference signal) outputted from the liquid sample sensor 2. Likewise, the four connection terminals 31b, 31d, 31f, and 31h disposed along the other short side are classified as terminals for feeding electric signals to the liquid sample sensor 2 and terminals for receiving electric signals (including a detection signal and a reference signal) outputted from the liquid sample sensor 2. In this modification example, of the four connection terminals 31a, 31c, 31e, and 31g disposed along one short side, the connection terminals 31a and 31c located closer to the corresponding ends of one short side serve to feed electric signals to the liquid sample sensor 2, and the centrally located two connection terminals 31e and 31g serve to receive electric signals (including a detection signal and a reference signal) outputted from the liquid sample sensor 2. On the other hand, of the four connection terminals 31b, 31d, 31f, and 31h disposed along the other short side, the centrally located connection terminals 31f and 31h serve to feed electric signals to the liquid sample sensor 2, and the connection terminals 31b and 31d located closer to the corresponding ends of the other short side serve to receive electric signals outputted from the liquid sample sensor 2. The present modified example can be implemented under conditions where no specific limitation is imposed upon the layout of the output-receiving terminals and the signal-feeding terminals. For example, the output-receiving terminal and the signal-feeding terminal can be disposed adjacent each other. Without limitations to terminal layout, internal wiring for connection between the control section 32 and each connection terminal can be configured with greater design flexibility.

Figure 10:
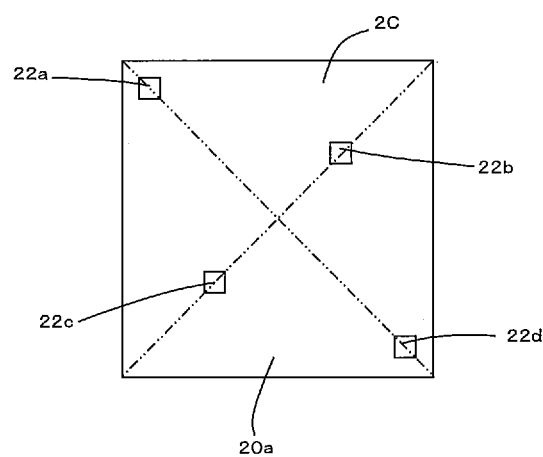
FIG. 10 is an external view showing another modified example of the liquid sample sensor 2.

While the first face 20a of the liquid sample sensor 2 has been illustrated as being rectangular-shaped, in the present embodiment, the shape of the first face 20a is not limited as long as the pattern of placement of the external terminals 22 exhibits two-fold rotational symmetry. That is, there is no need for the first face 20a to be shaped so as to bear a certain relation to the two-fold rotational symmetry of the pattern of placement of the external terminal 22. In the case of designing the first face 20a to have a two-fold rotational symmetric shape, the two-fold rotational symmetry of the first face 20a does not necessarily have to be the same as the two-fold rotational symmetry of the pattern of placement of the external terminal 22. FIG. 10 is an external view showing another modified example of the liquid sample sensor 2. For example, as shown in FIG. 10, at the first face 20a having a square shape, the pattern of placement of four external terminals 22 exhibits two-fold rotational symmetry. More specifically, the first external terminal 22a and the fourth external terminal 22d lie in one of diagonal lines drawn on the square-shaped first face 20a, whereas the second external terminal 22b and the third external terminal 22c lie in the other diagonal line drawn on the square-shaped first face 20a. The distance between the first external terminal 22a and the fourth external terminal 22d is greater than the distance between the second external terminal 22b and the third external terminal 22c. Also in this case, for example, as is the case with the liquid sample sensor 2, the first external terminal 22a and the second external terminal 22b are electrically connected to the detection section 21a, whereas the third external terminal 22c and the fourth external terminal 22d are electrically connected to the reference section 21b. Thus, the electrical connection between the external terminal 22 of the liquid sample sensor 2 and the connection terminal of the reader 3 can be established in any one of two different arrangements, namely the first arrangement and the second arrangement that differ 180° from each other in the orientation of the liquid sample sensor 2. This enables the user to carry out measurement by simple operation with less effort.

Second Embodiment

Figure 11A:
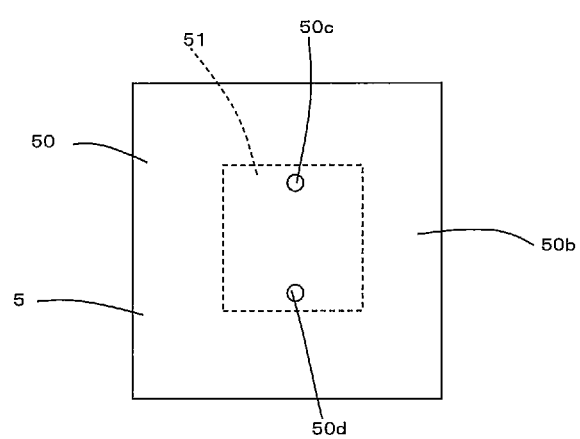
FIG. 11A is a plan view showing the appearance of a liquid sample sensor 5.
Figure 11B:
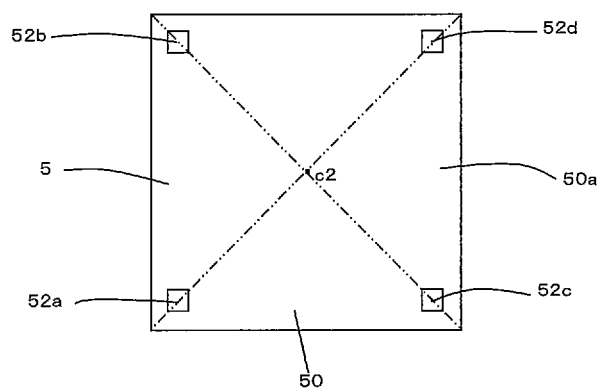
FIG. 11B is a bottom view showing the appearance of the liquid sample sensor 5.
Figure 12:
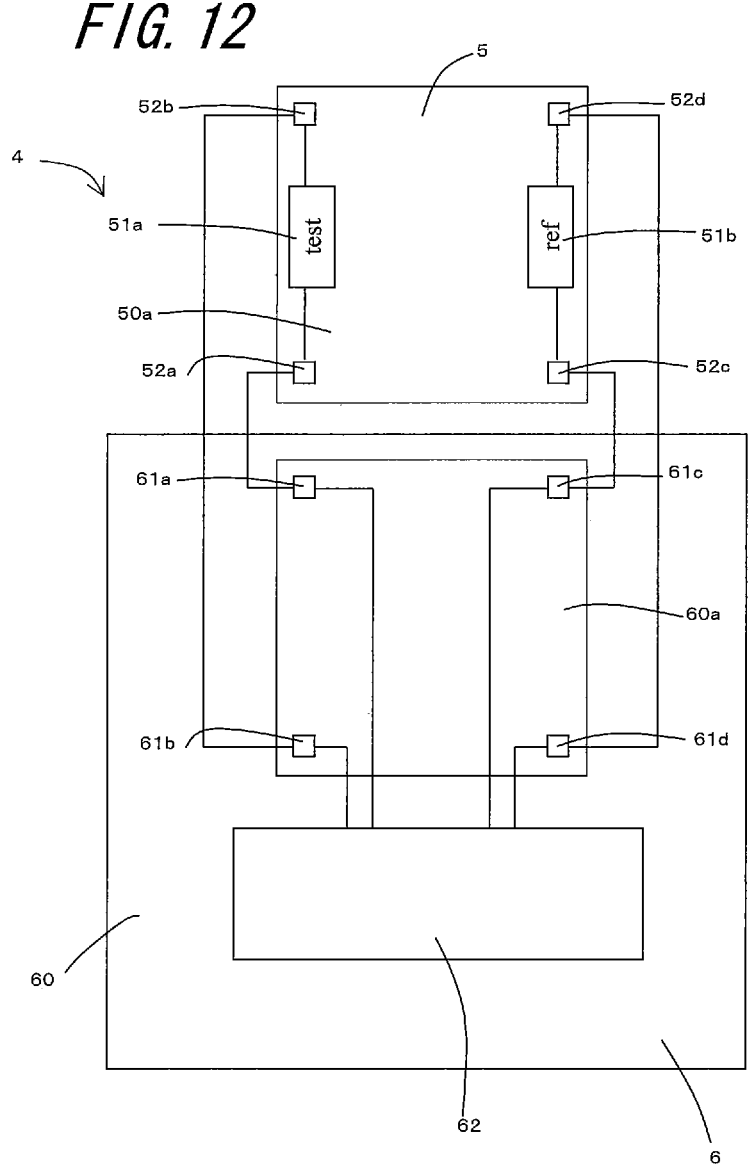
FIG. 12 is a schematic block diagram showing a sensor device 4 in accordance with a second embodiment of the invention in the first arrangement.

FIGS. 11A and 11B are each an external view showing the configuration of a liquid sample sensor 5. FIG. 11A is a plan view, and FIG. 11B is a bottom view. FIG. 12 is a schematic block diagram showing a sensor device 4 in accordance with a second embodiment of the invention in the first arrangement, and FIG. 13 is a schematic block diagram showing the sensor device 4 in the second arrangement. The sensor device 4 includes the liquid sample sensor 5 and a reader 6 in which the liquid sample sensor 5 is detachably mounted. The liquid sample sensor 5 and the reader 6 are similar in function to the liquid sample sensor 2 and the reader 3, respectively, of the first embodiment. That is, the liquid sample sensor 5 at least absorbs or receives a liquid sample, causes an electric signal supplied from the reader 6 to vary according to the properties or constituent components of the liquid sample, and outputs the varied electric signal to the reader 6. The reader 6 supplies an electric signal to the liquid sample sensor 5, and also receives an electric signal outputted from the liquid sample sensor 5.

The liquid sample sensor 5 includes a sensor main body 50 having a first face 50a, a sensor element 51 located in the sensor main body 50, and a plurality of external terminals 52 located on the first face 50a of the sensor main body 50. The external terminals 52 are electrically connected to the sensor element 51. The reader 6 includes a reader main body 60 having a second face 60a opposed to the first face 50a of the liquid sample sensor 5, a plurality of connection terminals 61 positioned so as to correspond one-to-one to the plurality of external terminals 52, and a control section 62 which is electrically connected to the plurality of connection terminals 61, and which carries out inputting and outputting electric signals.

In the present embodiment, as is the case with the first embodiment, the sensor main body 50 is shaped in a plate. One of the flat surfaces of the sensor main body 50 which are perpendicular to the thickness direction is defined as the first face 50a, and the other flat surface is defined as a third face 50b. The first face 50a is provided with the external terminals 52, and, the third face 50b is provided with an inlet 50c for introduction of a liquid sample and an outlet 50d for discharge of a liquid sample. After being supplied to the sensor main body 50 through the inlet 50c, a liquid sample is subjected to detection process in the sensor element 51 located in the sensor main body 50, and, following the completion of detection, the liquid sample is discharged from the outlet 50d.

In the present embodiment, the plurality of external terminals 52 are disposed on the first face 50a so as to exhibit rotational symmetry. While the present embodiment will be described with respect to the case where the liquid sample sensor 5 includes four external terminals as the plurality of external terminals, the number of the external terminals 52 is not limited to a specific value, and may thus be determined in conformity with input and output numbers for the sensor element 51, for example.

In the liquid sample sensor 5 shown in FIG. 12 by way of example, the first face 50a and the third face 50b have the same square shape. There are provided four external terminals 52a, 52b, 52c, and 52d each located at corresponding one of the four corners lying in diagonal lines drawn on the square-shaped face. Each external terminal 52 has a square shape. The external terminals 52 do not necessarily have to have the same shape, and may thus be made to have different shapes. These four external terminals 52a, 52b, 52c, and 52d are arranged so as to exhibit four-fold rotational symmetry. In the liquid sample sensor 5 of the present embodiment, the centroid of a square whose four vertices coincide with the centers of the four external terminals 52a, 52b, 52c, and 52d, respectively, defines the rotation center c2 of rotational symmetry. The third external terminal 52a and the sixth external terminal 52d are opposed to each other with respect to the rotation center c2 lying in between. The fourth external terminal 52b and the fifth external terminal 52c are opposed to each other with respect to the rotation center c2 lying in between. The pattern of placement of the four external terminals 52a, 52b, 52c, and 52d exhibits four-fold rotational symmetry, and thus, even after each and every 90° rotation of the liquid sample sensor about the rotation center c2, the pattern of terminal placement remains the same. In the present embodiment, given that an arrangement as shown in FIG. 12 is defined as the first arrangement serving as a reference arrangement, then an arrangement as shown in FIG. 13 attained by a 90° rotation of the liquid sample sensor from the original position is defined as the second arrangement. Moreover, an arrangement attained by a 180° rotation of the liquid sample sensor is defined as the third arrangement, and an arrangement attained by a 270° rotation of the liquid sample sensor is defined as the fourth arrangement. In the present embodiment, like the external terminals 52, the four connection terminals 61 of the reader 6 are also arranged so as to four-fold rotational symmetry.

As described above, there is a 90° difference in the orientation of the liquid sample sensor 5 set in the reader 6 between the first arrangement and the second arrangement. Accordingly, each external terminal 52 of the liquid sample sensor 5 makes electrical connection with a different connection terminal 61 of the reader 6 with a change from the first arrangement to the second arrangement and vice versa.

For example, in the first arrangement shown in FIG. 12, the external terminal and the connection terminal are connected as follows. The third external terminal 52a of the liquid sample sensor 5 is electrically connected to the third connection terminal 61a of the reader 6. The fourth external terminal 52b of the liquid sample sensor 5 is electrically connected to the fourth connection terminal 61b of the reader 6. The fifth external terminal 52c of the liquid sample sensor 5 is electrically connected to the fifth connection terminal 61c of the reader 6. The sixth external terminal 52d of the liquid sample sensor 5 is electrically connected to the sixth connection terminal 61d of the reader 6.

The third external terminal 52a and the fourth external terminal 52b of the liquid sample sensor 5 are electrically connected to a detection section 51a in the sensor element 51. Moreover, the fifth external terminal 52c and the sixth external terminal 52d of the liquid sample sensor 5 are electrically connected to a reference section 51b in the sensor element 51. Each of the third external terminal 52a, the fourth external terminal 52b, the fifth external terminal 52c, and the sixth external terminal 52d serves as both of an input terminal which receives an electric signal input and an output terminal which produces an electric signal output.

In the reader 6, the control section 62 inputs an electric signal to the third connection terminal 61a and the sixth connection terminal 61d, and supplies the electric signal to the liquid sample sensor 5. Moreover, the control section 62 receives an electric signal (including a detection signal and a reference signal) outputted from the liquid sample sensor 5 by the fourth connection terminal 61b and the fifth connection terminal 61c.

In the first arrangement shown in FIG. 12, the electrical connection between the third connection terminal 61a of the reader 6 and the third external terminal 52a of the liquid sample sensor 5 permits the supply of electric signals from the reader 6 to the detection section 51a of the liquid sample sensor 5. The electrical connection between the fourth connection terminal 61b of the reader 6 and the fourth external terminal 52b of the liquid sample sensor 5 enables the reader 6 to receive a detection signal produced in the detection section 51a. Moreover, the electrical connection between the sixth connection terminal 61d of the reader 6 and the sixth external terminal 52d of the liquid sample sensor 5 permits the supply of electric signals from the reader 6 to the reference section 51b of the liquid sample sensor 5. The electrical connection between the fifth connection terminal 61c of the reader 6 and the fifth external terminal 52c of the liquid sample sensor 5 enables the reader 6 to receive a reference signal produced in the reference section 51b. The reader 6 produces the result of detection of a detection object based on the detection signal and the reference signal received.

In the second arrangement shown in FIG. 13, the external terminal and the connection terminal are connected as follows. The third external terminal 52a of the liquid sample sensor 5 is electrically connected to the fourth connection terminal 61b of the reader 6. The fourth external terminal 52b of the liquid sample sensor 5 is electrically connected to the sixth connection terminal 61d of the reader 6. The fifth external terminal 52c of the liquid sample sensor 5 is electrically connected to the third connection terminal 61a of the reader 6. The sixth external terminal 52d of the liquid sample sensor 5 is electrically connected to the fifth connection terminal 61c of the reader 6.

In the second arrangement shown in FIG. 13, the electrical connection between the third connection terminal 61a of the reader 6 and the fifth external terminal 52c of the liquid sample sensor 5 permits the supply of electric signals from the reader 6 to the reference section 51b of the liquid sample sensor 5. The electrical connection between the sixth connection terminal 61d of the reader 6 and the fourth external terminal 52b of the liquid sample sensor 5 permits the supply of electric signals to the detection section 51a. Moreover, the electrical connection between the fifth connection terminal 61c of the reader 6 and the sixth external terminal 52d of the liquid sample sensor 5 enables the reader 6 to receive a reference signal produced in the reference section 51b of the liquid sample sensor 5. The electrical connection between the fourth connection terminal 61b of the reader 6 and the third external terminal 52a of the liquid sample sensor 5 enables the reader 6 to receive a detection signal produced in the detection section 51a. In the reader 6, the control section 62 produces the result of detection of a detection object based on the detection signal and the reference signal received.

In the present embodiment, in each of the first arrangement and the second arrangement, a detection signal is received by the fourth connection terminal 61b, and, a reference signal is received by the fifth connection terminal 61c. The control section 62 determines whether the signal received by the fourth connection terminal 61b is a detection signal or a reference signal, and also determines whether the signal received by the fifth connection terminal 61c is a detection signal or a reference signal, prior to the production of a detection result. For example, in the present embodiment, the control section 62 determines which one of the signal received by the fourth connection terminal 61b and the signal received by the fifth connection terminal 61c is a reference signal. When one of the received signals is identified as a reference signal, the other can be judged as a detection signal accordingly. The judgment as to whether the received signal is a reference signal or not is made in the same manner as that adopted in the first embodiment, and thus the description thereof will be omitted.

In the present embodiment, as is the case with the first arrangement and the second arrangement, the result of detection of a detection object can be outputted from the control section 62 also in the case with the third arrangement attained by a 180° rotation of the liquid sample sensor from the position corresponding to the first arrangement, as well as in the case with the fourth arrangement attained by a 270° rotation thereof from the position corresponding to the first arrangement. Thus, in setting the liquid sample sensor 5 in the reader 6 to carry out measurement, according to the second embodiment, the liquid sample sensor 5 can be set in any one of four oriented positions (corresponding to the first to fourth arrangements, respectively). In any one of the four arrangements, detection results can be outputted from the control section 62. This enables the user to carry out measurement by simple operation with less effort.

Modified Example of Second Embodiment

Figure 14A:
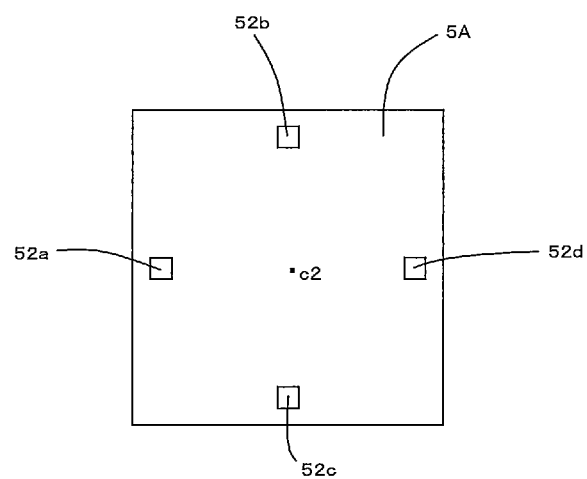
FIG. 14A is a plan view showing the appearance of a modified example of the liquid sample sensor 5.
Figure 14B:
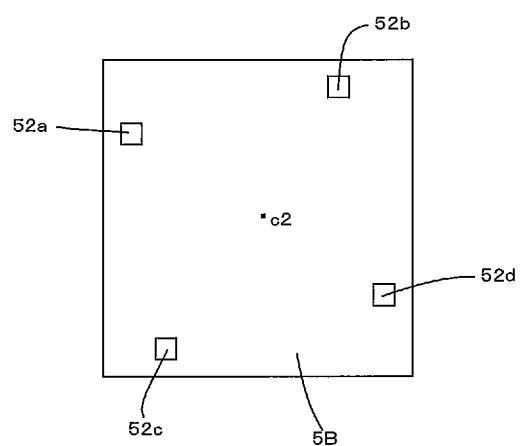
FIG. 14B is a bottom view showing the appearance of a modified example of the liquid sample sensor 5.

While the liquid sample sensor 5 has been illustrated as being so designed that the four external terminals 52 lie in the diagonal lines drawn on the square-shaped first face 50a, this design is not intended to be limiting of the present embodiment. FIGS. 14A and 14B are each an external view showing a modified example of the liquid sample sensor 5. In FIGS. 14A and 14B, for a better understanding of the layout of external terminals, there is shown only the appearance of the first face 50a of each of liquid sample sensors 5A and 5B implemented as modified examples. The third face 50b of each of the liquid sample sensors 5A and 5B may be either identical with or different from the third face of the liquid sample sensor 5 shown in FIG. 11. In the liquid sample sensor 5A shown in FIG. 14A, there are provided four external terminals 52a, 52b, 52c, and 52d, each lying in the bisector of a corresponding side of the first face 50a, which are equidistant from the corresponding sides of the first face 50a. Also in this case, as is the case with the liquid sample sensor 5, the third external terminal 52a and the sixth external terminal 52d are opposed to each other with respect to the rotation center c2 lying in between, and the fourth external terminal 52b and the fifth external terminal 52c are opposed to each other with respect to the rotation center c2 lying in between.

In the liquid sample sensor 5B shown in FIG. 14B, there are provided four external terminals 52a, 52b, 52c, and 52d, each located closer to one of two vertices defining the opposite ends of a corresponding side of the first face 50a with respect to the center of the side, which are equidistant from the corresponding sides of the first face 50a. Also in this case, as is the case with the liquid sample sensor 5, the third external terminal 52a and the sixth external terminal 52d are opposed to each other with respect to the rotation center c2 lying in between, and the fourth external terminal 52b and the fifth external terminal 52c are opposed to each other with respect to the rotation center c2 lying in between. As practiced in the liquid sample sensors 5, 5A, and 5B, the external terminals 52 are arranged so as to exhibit four-fold rotational symmetry, and so the user can carry out measurement regardless of the shape of the first face 50a and the terminal positioning within the first face 50a, even if any one of the first to fourth arrangements is taken up. This enables the user to carry out measurement by simple operation with less effort.

Figure 15A:
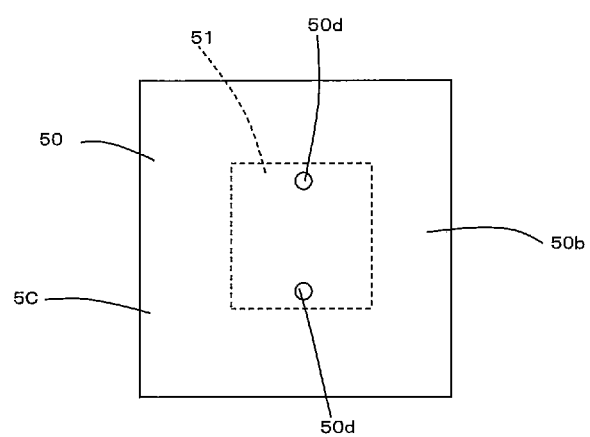
FIG. 15A is a plan view showing the appearance of the liquid sample sensor 5.
Figure 15B:
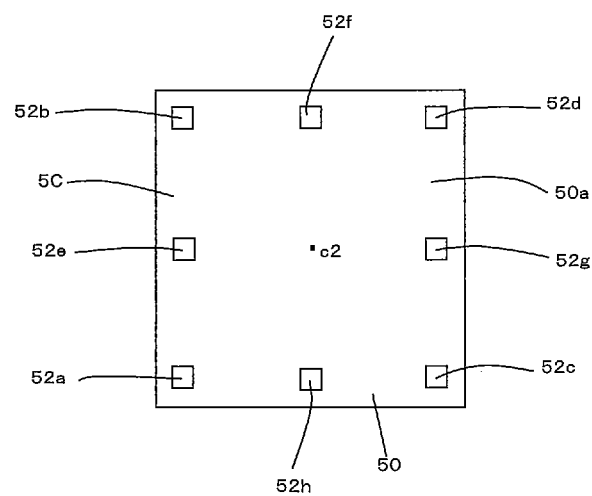
FIG. 15B is a bottom view showing the appearance of the liquid sample sensor 5.
Figure 16:
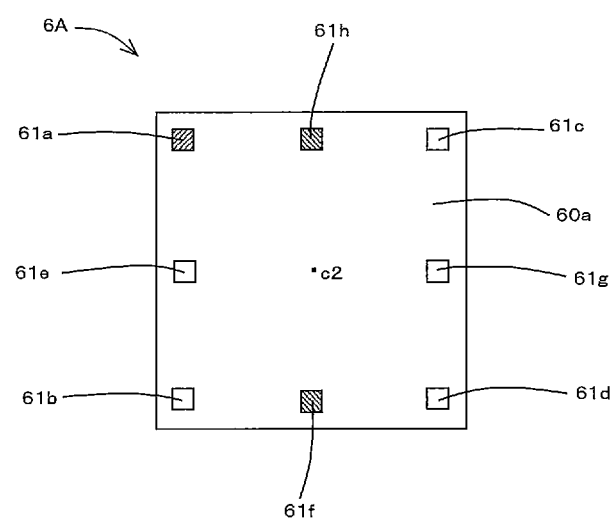
FIG. 16 is a schematic drawing showing a modified example of a reader 6.

FIG. 15 is an external view showing a modified example of the liquid sample sensor 5. FIG. 15A is a plan view, and FIG. 15B is a bottom view. FIG. 16 is a schematic drawing showing a modified example of the reader 6. In a liquid sample sensor 5C implemented as a modification example, eight connection terminals 52 are disposed on the first face 50a. The eight connection terminals 52, which are arranged along the four sides of the first face 50a, include four external terminals 52a, 52b, 52c, and 52d each located at corresponding one of the four corners of the first face 50a, and four external terminals 52e, 52f, 52g, and 52h, each lying in the bisector of a corresponding side of the first face 50a, which are equidistant from the corresponding sides of the first face 50a. Such a pattern of placement of the eight external terminals 52 exhibits four-fold rotational symmetry.

A reader 6A implemented as a modified example includes, on a second face 60a thereof, eight connection terminals 61 positioned so as to correspond one-to-one to the eight external terminals 52 of the liquid sample sensor 5C. That is, there are provided four connection terminals 61a, 61b, 61c, and 61d each situated at corresponding one of the four corners of the second face 60a, and four connection terminals 61e, 61f, 61g, and 61h, each lying in the bisector of a corresponding side of the second face 60a, which are equidistant from the corresponding sides of the second face 60a. Of the four connection terminals 61a, 61b, 61c, and 61d each located at corresponding one of the four corners, the connection terminals 61a and 61d lie in one of diagonal lines drawn on the second face 60a, whereas the connection terminals 61b and 61c lie in the other diagonal line. For example, the connection terminals 61a and 61d lying in one diagonal line serve to feed electric signals to the liquid sample sensor 2, whereas the connection terminals 61b and 61c lying in the other diagonal line serve to receive electric signals (including a detection signal and a reference signal) outputted from the liquid sample sensor 2, and, of the four connection terminals 61e, 61f, 61g, and 61h, the two connection terminals 61e and 61h opposed to each other with respect to the rotation center c2 lying in between serve to feed electric signals to the liquid sample sensor 2, whereas the other two connection terminals 61f and 61g opposed to each other with respect to the rotation center c2 lying in between serve to receive electric signals outputted from the liquid sample sensor 2. In this case, given that these eight connection terminals 61 are classified as four feeding terminals and four receiving terminals, then the feeding terminals and the receiving terminals are arranged so as to exhibit rotational symmetry with respect to the rotation center c2. As practiced in the liquid sample sensors 5, 5A, 5B and 5C, the external terminals 52 are arranged so as to exhibit four-fold rotational symmetry, and so the user can carry out measurement regardless of the number of terminals even if any one of the first to fourth arrangements is taken up. This enables the user to carry out measurement by simple operation with less effort.

Third Embodiment

Figure 17:
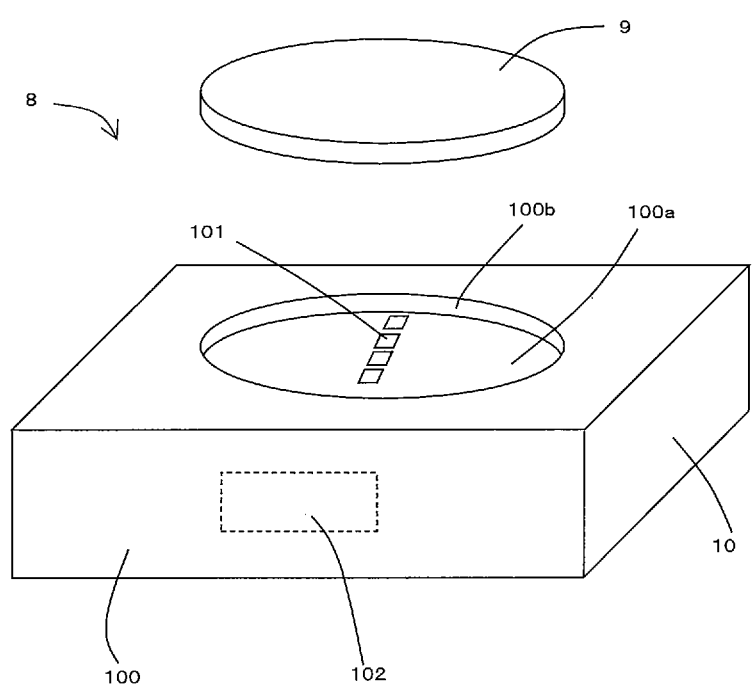
FIG. 17 is a schematic drawing showing the structure of a sensor device 8 in accordance with a third embodiment of the invention.
Figure 18A:
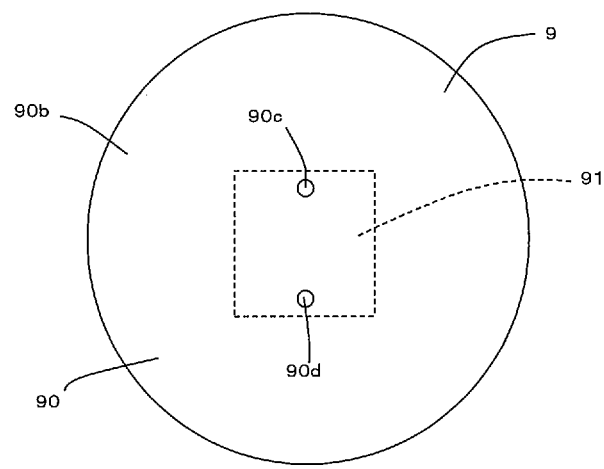
FIG. 18A is a plan view showing the appearance of a liquid sample sensor 9.
Figure 18B:
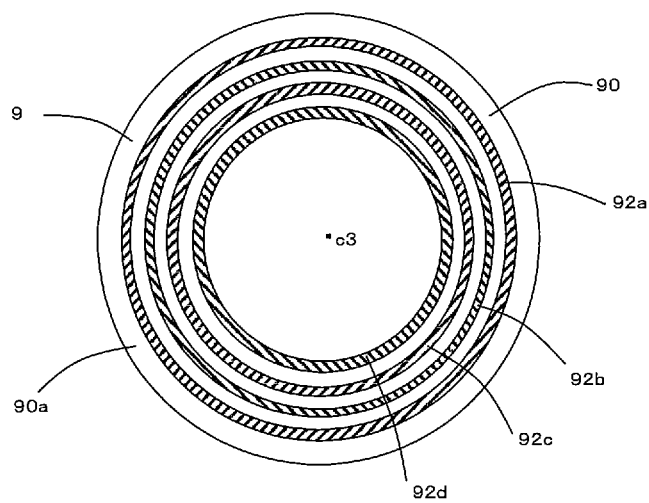
FIG. 18B is a bottom view showing the appearance of the liquid sample sensor 9.

FIG. 17 is a schematic drawing showing the structure of a sensor device 8 in accordance with a third embodiment of the invention. FIGS. 18A and 18B are external views showing the configuration of a liquid sample sensor 9. FIG. 18A is a plan view, and FIG. 18B is a bottom view. The sensor device 8 includes the liquid sample sensor 9 and a reader 10 in which the liquid sample sensor 9 is detachably mounted. The liquid sample sensor 9 and the reader 10 are similar in function to the liquid sample sensor 2 and the reader 3, respectively, of the first embodiment. That is, the liquid sample sensor 9 at least absorbs or receives a liquid sample, causes an electric signal supplied from the reader 10 to vary according to the properties or constituent components of the liquid sample, and outputs the varied electric signal to the reader 10. The reader 10 supplies an electric signal to the liquid sample sensor 9, and also receives an electric signal outputted from the liquid sample sensor 9.

The liquid sample sensor 9 includes a sensor main body 90 including a first face 90a, a sensor element 91 located in the sensor main body 90, and a plurality of external terminals 92 located on the first face 90a of the sensor main body 90. The external terminals 92 are electrically connected to the sensor element 91. The reader 10 includes a reader main body 100 including a second face 100a opposed to the first face 90a of the liquid sample sensor 9, a plurality of connection terminals 101 positioned so as to correspond one-to-one to the plurality of external terminals 92, and a control section 102 which is electrically connected to the plurality of connection terminals 101, and which carries out inputting and outputting electric signals.

In the present embodiment, as is the case with the first embodiment, the sensor main body 90 is shaped in a plate. One of the flat surfaces of the sensor main body 90 which are perpendicular to the thickness direction is defined as the first face 90a in circular form, and the other flat surface is defined as a third face 90b in circular form. The first face 90a is provided with the external terminals 92, and, the third face 90b is provided with an inlet 90c for introduction of a liquid sample and an outlet 90d for discharge of a liquid sample. After being supplied to the sensor main body 90 through the inlet 90c, a liquid sample is subjected to detection process in the sensor element 91 located in the sensor main body 90, and, following the completion of detection, the liquid sample is discharged from the outlet 90d. In the reader 10 according to the present embodiment, the second face 100a opposed to the first face 90a of the liquid sample sensor 9 has the same circular shape as that of the first face 90a. The second face 100a defines the bottom of a recess formed at the surface of the reader main body 100. An inner periphery 100b of the recess extends along the outer periphery of the second face 100a serving as the recess bottom, and also extends substantially vertically from the second face 100a. Just like the second face 100a, the opening of the recess has a circular shape.

In the present embodiment, the plurality of external terminals 92 are disposed on the first face 90a so as to exhibit rotational symmetry. While the present embodiment will be described with respect to the case where the liquid sample sensor 9 includes four external terminals as the plurality of external terminals 92, the number of the external terminals 92 is not limited to a specific value, and may thus be determined in conformity with input and output numbers for the sensor element 91, for example.

In the liquid sample sensor 9 shown in FIG. 17 by way of example, the first face 90a and the third face 90b have the same circular shape, and there are provided four external terminals 92a, 92b, 92c, and 92d in ring-like form arranged in a concentric fashion. The center of each of the concentric rings coincides with a center c3 of the first face 90a. While the rings have the same width dimension and are equispaced in the present embodiment, the rings may be designed to have different widths and may be arranged at various spacings (with different gaps). The width of a ring and the spaced interval between adjacent rings may be varied to render the plurality of ring-shaped external terminals 92 similar to each other in electrical characteristics such as electrical resistance and electrical length, for example. The pattern of placement of the external terminals 92 defined by concentric rings exhibits n-fold rotational symmetry (n represents a predetermined integer). The rotation center c3 coincides with the centers of the concentric rings. In the present embodiment, with respect to the first arrangement set as a reference arrangement, the second arrangement may be attained by rotating the liquid sample sensor 9 about the rotation center c3 regardless of whatever rotation angle the liquid sample sensor 9 takes. That is, any one of arrangements other than the first arrangement may be defined as the second arrangement. In the present embodiment, the seventh external terminal 92a is shaped in a ring having the largest radius, the eighth external terminal 92b is shaped in a ring having the second-largest radius, the ninth external terminal 92c is shaped in a ring having the third-largest radius, and the tenth external terminal 92d is shaped in a ring having the fourth-largest radius (the smallest radius).

Figure 19:
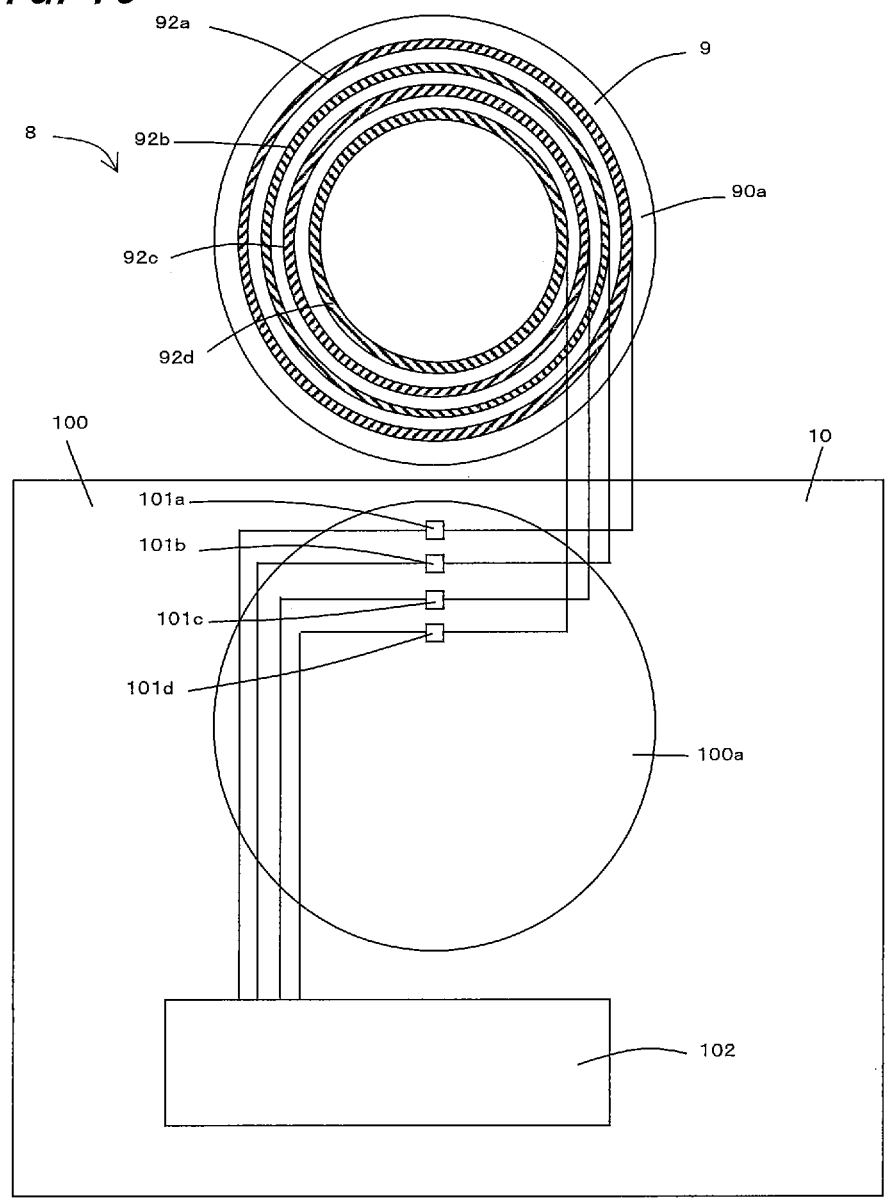
FIG. 19 is a schematic block diagram showing the sensor device 8 in accordance with the third embodiment of the invention.

The four connection terminals 101 of the reader 10 do not necessarily have to be arranged in rotationally symmetrical relation. In the present embodiment, under conditions where the distance between each connection terminal and a center c4 of the second face 100a is equal to the radius of corresponding one of the four concentrically arranged ring-shaped external terminals 92a, 92b, 92c, and 92d, the four connection terminals 101 may be placed in freely-selected locations. FIG. 19 is a schematic block diagram showing the sensor device 8 in accordance with the third embodiment of the invention. For example, in the case shown in FIG. 19, the external terminal and the connection terminal are connected as follows. The seventh external terminal 92a of the liquid sample sensor 9 is electrically connected to the seventh connection terminal 101a of the reader 10. The eighth external terminal 92b of the liquid sample sensor 9 is electrically connected to the eighth connection terminal 101b of the reader 10. The ninth external terminal 92c of the liquid sample sensor 9 is electrically connected to the ninth connection terminal 101c of the reader 10. The tenth external terminal 92d of the liquid sample sensor 9 is electrically connected to the tenth connection terminal 101d of the reader 10.

In user's work to set the liquid sample sensor 9 in the reader 10 to carry out measurement, the user can carry out measurement regardless of whatever rotation angle the liquid sample sensor 9 takes. This makes it possible to reduce time and effort imposed on the work in preparation for measurement such as the trouble of having to set the liquid sample sensor 2 in a correct oriented position, and thereby enable the user to carry out measurement by simple operation without any regard to the orientation of the liquid sample sensor 9. Moreover, at the time of mounting the liquid sample sensor 9 having a circular outside shape so that the first face 90a can be located on the second face 100a of the reader 10, the liquid sample sensor 9 is guidedly introduced into the opening having a circular outside shape. In consequence, each of the four external terminals 92a, 92b, 92c, and 92d of the first face 90a abuts against corresponding one of the four connection terminals 101a, 101b, 101c, and 101d of the second face 100a, thus assuring electrical connection between the external terminal and the connection terminal. By virtue of the recess formed in the main body of the reader 10 as a guide to guide the liquid sample sensor 9, the user can carry out measurement with greater ease in operation without any regard not only to the orientation of the liquid sample sensor 9 but also to the location of the terminal.

The seventh external terminal 92a and the eighth external terminal 92b of the liquid sample sensor 9 are electrically connected to a detection section in the sensor element 91. Moreover, the ninth external terminal 92c and the tenth external terminal 92d of the liquid sample sensor 9 are electrically connected to a reference section in the sensor element 91.

In the present embodiment, the four connection terminals 101 of the reader 10 are aligned in a row in a radial direction. In the reader 10, the control section 102 inputs an electric signal to the seventh connection terminal 101a and the ninth connection terminal 101c, and supplies the electric signal to the liquid sample sensor 9. Moreover, the control section 102 receives an electric signal (including a detection signal and a reference signal) outputted from the liquid sample sensor 9 by the eighth connection terminal 101b and the tenth connection terminal 101d.

The electrical connection between the seventh connection terminal 101a of the reader 10 and the seventh external terminal 92a of the liquid sample sensor 9 permits the supply of electric signals from the reader 10 to the detection section of the liquid sample sensor 9. The electrical connection between the eighth connection terminal 101b of the reader 10 and the eighth external terminal 92b of the liquid sample sensor 9 enables the reader 10 to receive a detection signal produced in the detection section. Moreover, the electrical connection between the ninth connection terminal 101c of the reader 10 and the ninth external terminal 92c of the liquid sample sensor 9 permits the supply of electric signals from the reader 10 to the reference section of the liquid sample sensor 9. The electrical connection between the tenth connection terminal 101d of the reader 10 and the tenth external terminal 92d of the liquid sample sensor 9 enables the reader 10 to receive a reference signal produced in the reference section. The reader 10 produces the result of detection of a detection object based on the detection signal and the reference signal received.

In the present embodiment, the abutting contact between the external terminal 92 of the liquid sample sensor 9 and the connection terminal 101 of the reader 10 can be constantly maintained even if the liquid sample sensor 9 is rotated by any rotation angle about the rotation center c3. This enables the user to carry out measurement simply by putting the liquid sample sensor 9 on the reader 10 without any regard to the orientation (setting position) of the liquid sample sensor 9. Under conditions where the distance between each connection terminal 101 and the center c4 of the second face 100a is equal to the radius of corresponding one of the four external terminals 92, the connection terminals 101 of the reader 10 may be placed in freely-selected locations without causing a failure in abutting contact with the four external terminals 92 for assuring electrical connection between the external terminal and the connection terminal.

Modified Example of Third Embodiment

While the liquid sample sensor 9 has been illustrated as having four external terminals, this design is not intended to be limiting of the present embodiment. The number of the external terminals may be six or eight, or more. An increase in the number of the external terminals permits placement of a plurality of detection sections and reference sections.

Figure 20:
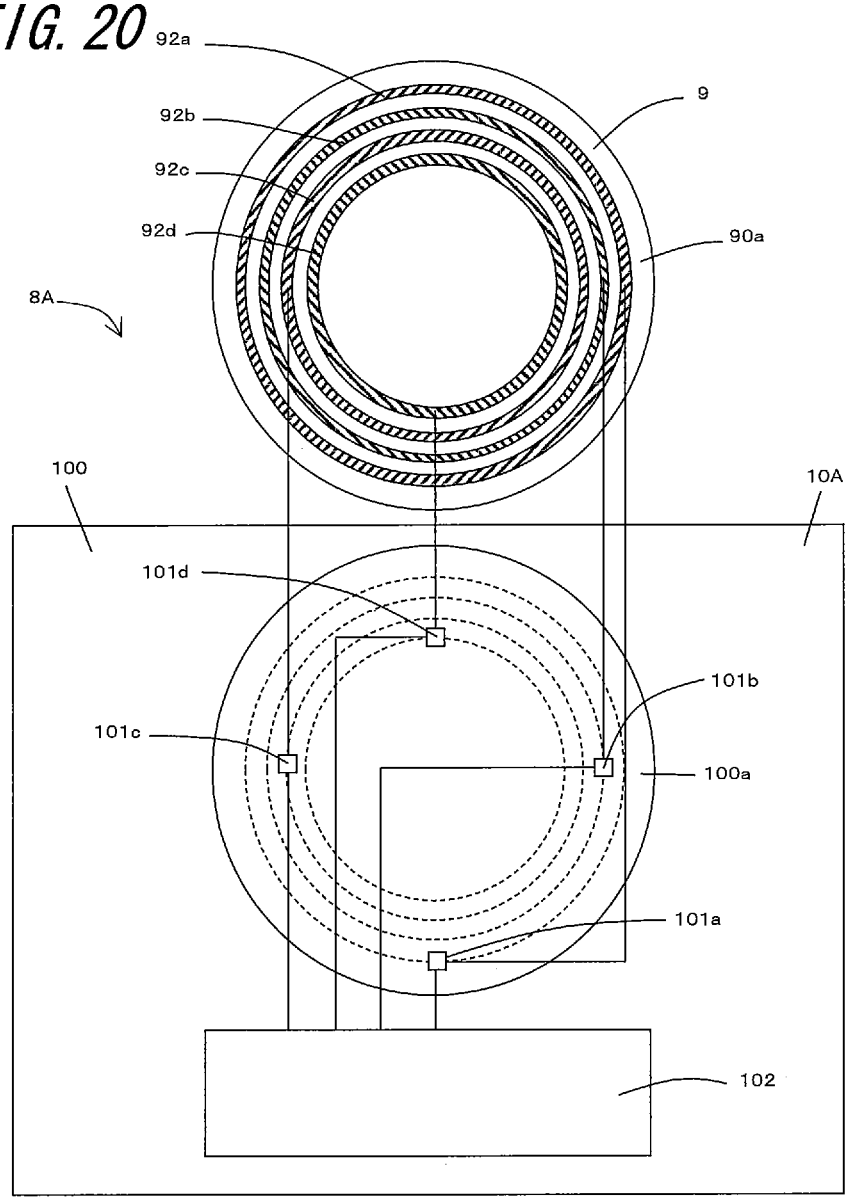
FIG. 20 is a schematic block diagram showing a sensor device 8A of a modified example of the third embodiment of the invention.

While the connection terminals 101 of the reader 10 have been illustrated as being aligned in a row in the radial direction, the connection terminals 101 may be disposed so as to make electrical connection with the corresponding concentrically arranged ring-shaped external terminals 92, and therefore each of the connection terminals 101 may be disposed so as to lie on corresponding one of four concentric circles. For example, as shown in the schematic block diagram of FIG. 20, in a sensor device 8A, a reader 10A includes a seventh connection terminal 101a, an eighth connection terminal 101b, a ninth connection terminal 101c, and a tenth connection terminal 101d arranged so as to be distributed in a random pattern.

Figure 21:
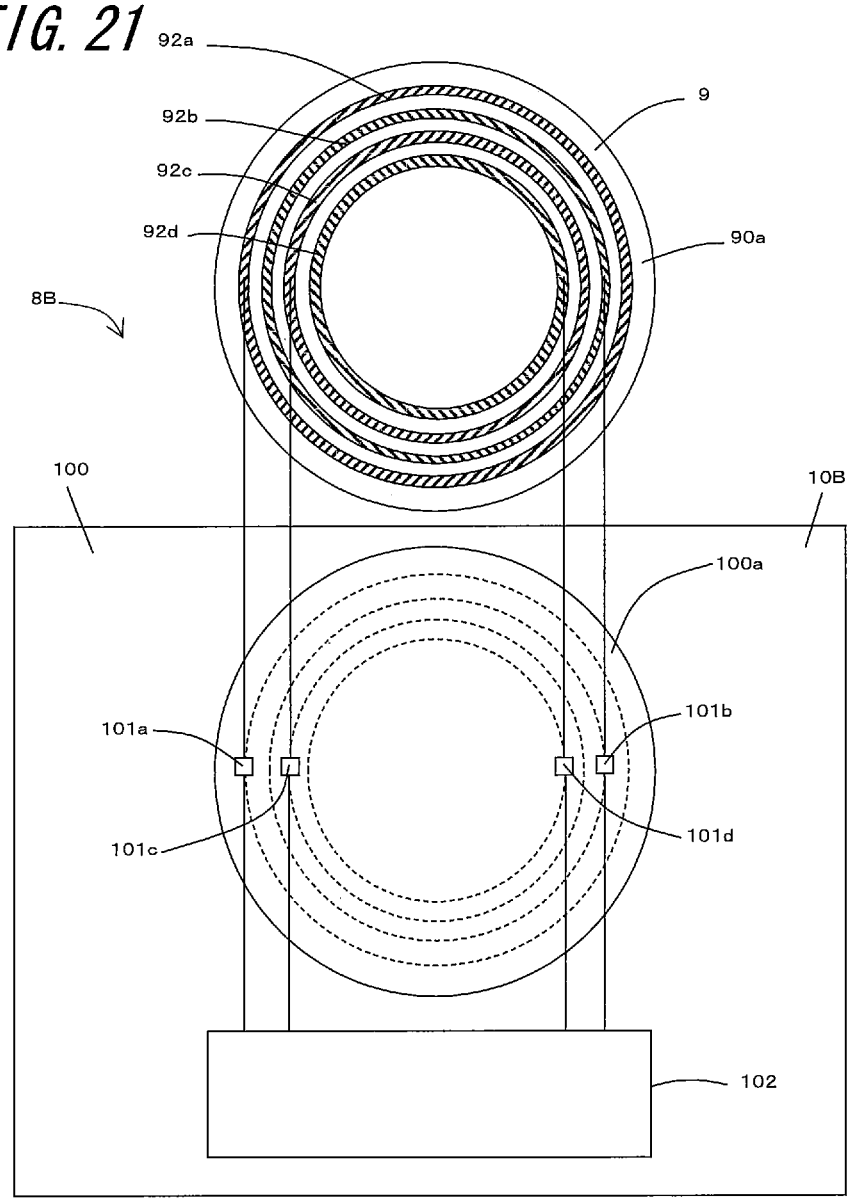
FIG. 21 is a schematic block diagram showing a sensor device 8B of a modified example of the third embodiment of the invention.

Moreover, as shown in the schematic block diagram of FIG. 21, in a sensor device 8B, a reader 10B includes a seventh connection terminal 101a, an eighth connection terminal 101b, a ninth connection terminal 101c, and a tenth connection terminal 101d, of which a set of the seventh and ninth connection terminals 101a and 101c serving as connection terminals for giving an electric signal output to the liquid sample sensor 9 and a set of the eighth and tenth connection terminals 101b and 101d serving as connection terminals for receiving an electric signal input from the liquid sample sensor 9 are disposed face to face with each other. This positioning leaves a sufficient spacing between the electric signal-output connection terminal and the electric signal-input connection terminal, with consequent reduction in electromagnetic interference between an outputted electric signal and an inputted electric signal.

In the present embodiment, the external terminals 92 in the form of concentric rings do not necessarily have to be shaped in continuous closed rings. The concentric ring-shaped external terminals 92 may include an external terminal shaped in an open ring having a discontinuity. As shown in the schematic block diagram of FIG. 22, in a sensor device 8C, a seventh external terminal 92e in the form of a ring having the largest radius and an eighth external terminal 92f in the form of a ring having the second-largest radius are each shaped in an open ring having a discontinuity. On the other hand, a ninth external terminal 92c and a tenth external terminal 92d are each shaped in a continuous closed ring. Where an external terminal 92 having a discontinuity is provided, a connection terminal 101 of a reader 10 corresponding to the external terminal is made larger in width than the discontinuity. More specifically, a seventh connection terminal 101e corresponding to the seventh external terminal 92e having a discontinuity is made larger in width than the discontinuity of the seventh external terminal 92e, and, an eighth connection terminal 101f corresponding to the eighth external terminal 92f having a discontinuity is made larger in width than the discontinuity of the eighth external terminal 92f. In this case, the abutting contact between the external terminal 92 of the liquid sample sensor 9 and the connection terminal 101 of the reader 10 can be constantly maintained regardless of the rotation angle of the liquid sample sensor 9, thus assuring electrical connection between the external terminal 92 and the connection terminal 101.

Figure 22:
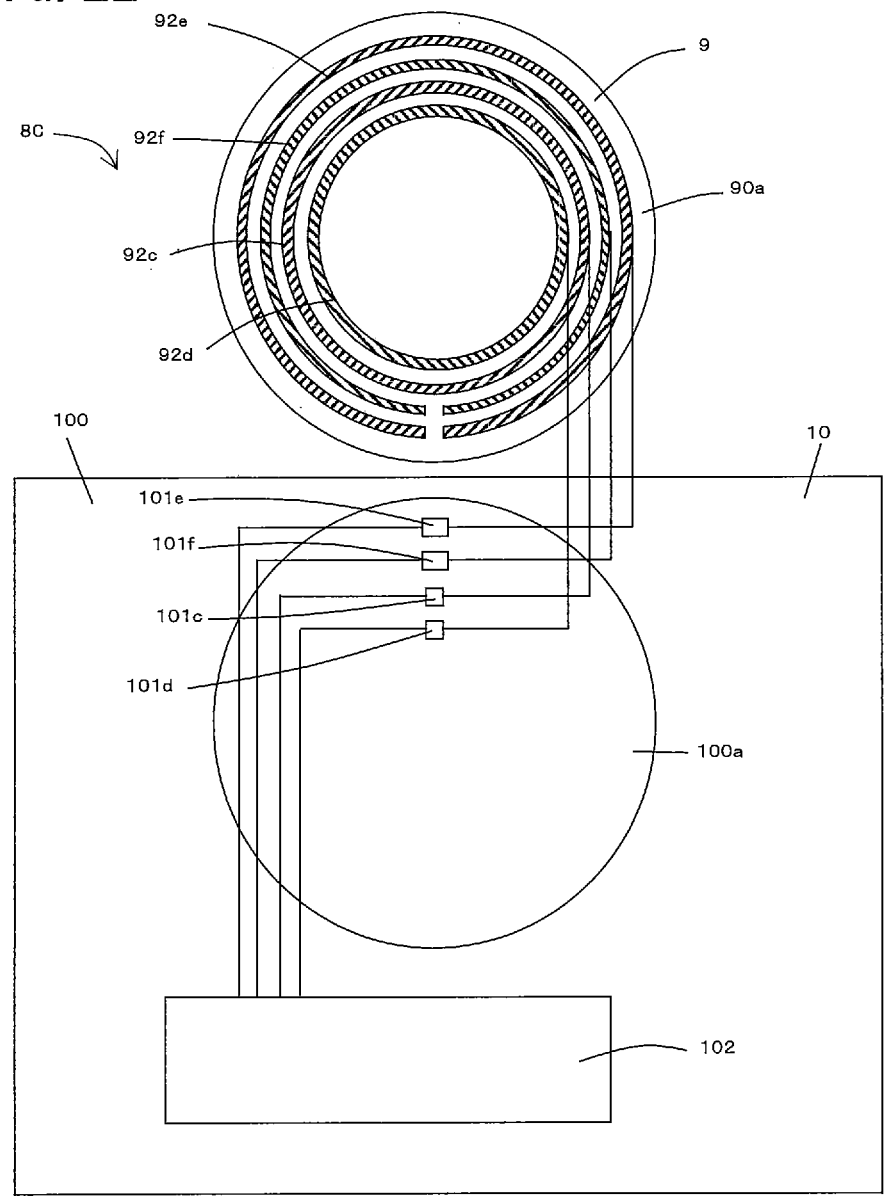
FIG. 22 is a schematic block diagram showing a sensor device 8C of a modified example of the third embodiment of the invention.

While the plurality of external terminals 92 shown in FIG. 22 include those bearing a discontinuity and those free of a discontinuity, every one of the external terminals 92 may have a discontinuity. In this case, every one of the connection terminals 101 is made larger in width than the discontinuity of the external terminal 92. The discontinuities of the individual external terminals 92 may be made to have either the same width or different widths. Moreover, a plurality of discontinuities may be formed in a single ring-shaped external terminal 92. In this case, the discontinuities may be made to have either the same width or different widths. In designing the plurality of external terminals 92, the width of a discontinuity and the number of discontinuities may be varied to render the plurality of external terminals 92 similar to each other in electrical characteristics.

Fourth Embodiment

Figure 23A:
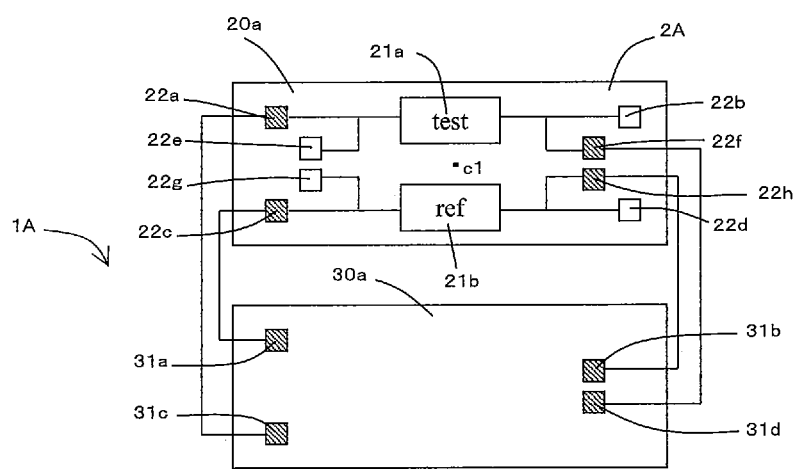
FIG. 23A is a schematic block diagram (first arrangement) showing a sensor device 1A in accordance with a fourth embodiment of the invention.
Figure 23B:
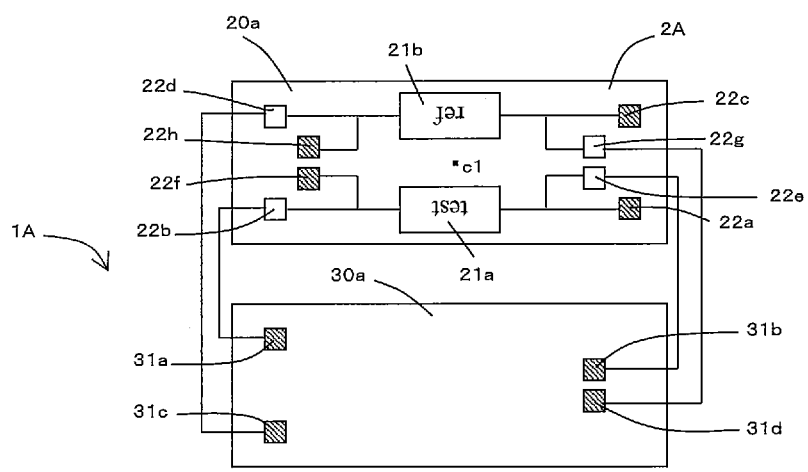
FIG. 23B is a schematic block diagram (second arrangement) showing the sensor device 1A in accordance with the fourth embodiment of the invention.

FIGS. 23A and 23B are schematic block diagrams showing a sensor device 1A in accordance with a fourth embodiment of the invention. FIG. 23A shows the first arrangement, and FIG. 23B shows the second arrangement. The present embodiment exemplifies a modified example of the first embodiment. The present embodiment employs a liquid sample sensor 2A identical in the positioning of external terminals 22 with the liquid sample sensor 2A shown in FIG. 8A. As distinct from the first embodiment, the first external terminal 22a and the external terminal 22e are connected to one side of the detection section 21a. The detection section 21a and each of the first external terminal 22a and the external terminal 22e are connected by branch wires. Likewise, the second external terminal 22b and the external terminal 22f are connected to the other side of the detection section 21a. Moreover, the third external terminal 22c and the external terminal 22g are connected to one side of the reference section 21b, and the fourth external terminal 22d and the external terminal 22h are connected to the other side of the reference section 21b.

The liquid sample sensor 2A includes eight external terminals 22 as described above, whereas the reader 3 includes four connection terminals 31. Moreover, the connection terminals 31a, 31b, 31c, and 31d are not arranged so as to exhibit rotational symmetry. Thus, as shown in FIG. 23A, in the first arrangement, of the eight external terminals 22 of the liquid sample sensor 2A, the four external terminals 22a, 22c, 22f, and 22h are each electrically connected to corresponding one of the connection terminals 31a, 31b, 31c, and 31d, and the other four external terminals stay in open condition. On the other hand, as shown in FIG. 23B, in the second arrangement, of the eight external terminals 22 of the liquid sample sensor 2A, the four external terminals 22b, 22d, 22e, and 22g, which are not connected to the corresponding connection terminals 31a, 31b, 31c, and 31d in the first arrangement, are each electrically connected to corresponding one of the connection terminals 31a, 31b, 31c, and 31d, and the other four external terminals, which are each connected to corresponding one of the connection terminals 31 in the first arrangement, stay in open condition. Of the four external terminals 22a, 22c, 22f, and 22h connected to corresponding one of the connection terminals 31a, 31b, 31c, and 31d in the first arrangement, the external terminals 22a and 22c are disposed as two outward terminals, whereas the external terminals 22f and 22h are disposed as two inward terminals. On the other hand, of the four external terminals 22b, 22d, 22e, and 22g connected to corresponding one of the connection terminals 31a, 31b, 31c, and 31d in the second arrangement, the external terminals 22b and 22d are disposed as two outward terminals, whereas the external terminals 22e and 22g are disposed as two inward terminals. Although, like the connection terminals 31, the four external terminals connected to the corresponding connection terminals 31a, 31b, 31c, and 31d in the first arrangement or the second arrangement are not arranged so as to exhibit rotational symmetry, the pattern of placement of the eight external terminals 22 in the liquid sample sensor 2A exhibits rotational symmetry. Thus, even in such a case, measurement can be carried out both in the case of setting the liquid sample sensor 2A in the reader 3 so as to attain the first arrangement and in the case of setting the liquid sample sensor 2A in the reader 3 so as to attain the second arrangement. When attention is drawn only to the external terminals 22 connected to the corresponding connection terminals 31, even if these external terminals are not arranged so as to exhibit rotational symmetry, as long as the external terminals 22 are arranged so as to exhibit rotational symmetry as a whole, the user can carry out measurement even if any one of the first arrangement and the second arrangement is taken up. This enables the user to carry out measurement by simple operation with less effort.

Fifth Embodiment

FIG. 24 is a flow chart showing procedures in a detecting method in accordance with a fifth embodiment of the invention. The fifth embodiment exemplifies a method of detecting an object to be detected by each of the sensor devices 1, 4, and 8 thus far described. Although the following description deals with the case of using the sensor device 1, other aforenamed sensor devices are applicable.

In Step s1 (first step), the first face 20a of the liquid sample sensor 2 is put on the second face 30a of the reader 3. At least one of the pattern of placement of the connection terminals 31 and the pattern of placement of the external terminals 22 positioned so as to correspond one-to-one to the connection terminals 31 exhibits rotational symmetry. Thus, in Step s2 (second step), with the liquid sample sensor set in any one of a plurality of oriented positions, an electric signal is supplied to the sensor element 21 under conditions where electrical connection is established between the connection terminal 31 and the external terminal 22.

In Step s3 (third step), a detection signal produced in the sensor element 21 in response to the supplied electric signal is inputted, via the external terminal 22, to the connection terminal 31. In Step s4 (fourth step), the reader 3 produces a detection result based on the inputted detection signal.

Since, even if the liquid sample sensor 2 is mounted in any one of a plurality of oriented positions in the first step, the electrical connection between the liquid sample sensor 2 and the reader 3 is secured in the subsequent steps, the user can carry out measurement with ease and yet without fail.

In the detecting method according to the present embodiment, for continuous monitoring of variations in detection results over time, a liquid sample subjected to detection process may be supplied to the sensor element 21 of the liquid sample sensor 2 during the interval when the second to fourth steps are being performed continuously. In the present embodiment, for example, as Step sA, a liquid sample is supplied between Step s1 (first step) and Step s2 (second step). Alternatively, a liquid sample may be supplied prior to Step s1 (first step), a liquid sample may be supplied between Step s2 (second step) and Step s3 (third step), or a liquid sample may be supplied subsequent to Step s4 (fourth step).

As described above, the reference section of the liquid sample sensor 2 is connected to the different connection terminals 31 of the reader between the first arrangement and the second arrangement. In this case, in the third step, a reference signal produced in the sensor element 21 in response to the supplied electric signal is additionally inputted to the connection terminal 31. Between the third step and the fourth step, there is further provided a determination step of determining which one of electric signals inputted to the connection terminals 31 is a detection signal or a reference signal. In the fourth step, a detection result is outputted based on the result of determination as to which one of the inputted electric signals is a detection signal or a reference signal.

While the invention has been shown in several forms (embodiments and modification examples), it should be understood that the invention is not so limited but is susceptible of various changes, modifications, and improvements without departing from the scope of the claimed invention. For example, it is possible to implement a sensor device and a detecting method by utilizing suitable combinations of the individual constituent components and procedural steps thus far described.

OTHER MODIFIED EXAMPLES

Figure 25:
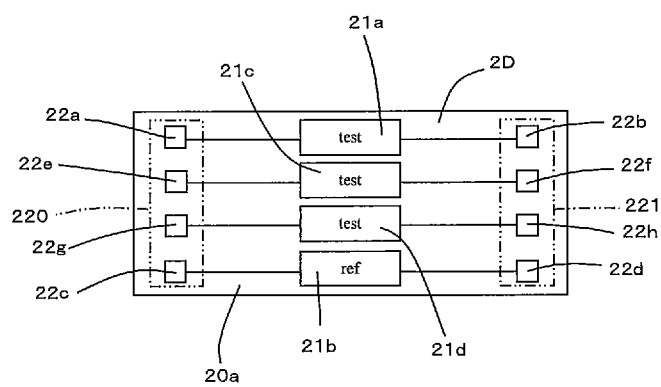
FIG. 25 is a schematic block diagram showing a liquid sample sensor 2D of a modified example of the first embodiment of the invention.

While the embodiments have been described with respect to the case where the liquid sample sensor has a single detection section and a single reference section, as an alternative, in the liquid sample sensor, at least one of the detection section and the reference section may be increased to two or more in number. For example, as shown in the schematic block diagram of FIG. 25, in a liquid sample sensor 2D, there are provided eight external terminals 22, of which an external terminal 22a and an external terminal 22b are connected to a detection section 21a, and an external terminal 22c and an external terminal 22d are connected to a reference section 21b, and furthermore, an external terminal 22e and an external terminal 22f are connected to a detection section 21c, and an external terminal 22g and an external terminal 22h are connected to a detection section 21d. In the present embodiment, three detection sections and one reference section are provided. The eight external terminals 22 are arranged so as to exhibit two-fold rotational symmetry, and thus, as is the case with the first embodiment, measurement can be carried out even in any one of the first arrangement and the second arrangement which differ 180° from each other in the orientation of the liquid sample sensor.

Moreover, while the embodiments have been described with respect to the case where at least one of the pattern of placement of a plurality of external terminals and the pattern of placement of a plurality of connection terminals exhibits rotational symmetry, as an alternative, both of the pattern of placement of a plurality of external terminals and the pattern of placement of a plurality of connection terminals may be configured to exhibit rotational symmetry.

Moreover, while the embodiments other than the third embodiment employing concentrically arranged ring-shaped external terminals have been described with respect to the case of ascertaining which one of signals outputted from the liquid sample sensor is a reference signal to produce detection results, instead of identification of a reference signal, identification of a detection signal may be adopted for detection result production.

Moreover, while, in the above-described embodiments, the reader main body is provided with a recess as a guide to guide the liquid sample sensor for the positioning of the external terminal of the liquid sample sensor and the connection terminal of the reader which are electrically connected to each other, instead of this design, as the guide, a plurality of projections may be formed on the surface of the reader main body so as to extend from the surface while conforming to the outside shape of the liquid sample sensor. Where the sensor main body of the liquid sample sensor is shaped in a circular plate as practiced in the third embodiment, as the guide, a set of a pin and a hole may be provided. The pin is disposed at one of the center of the ring-shaped electrode of the reader main body and the center of the circular first face of the sensor main body, and the hole is disposed at the other center.

As long as the external terminal of the liquid sample sensor and the connection terminal of the reader are positioned as described above, electrical connection between the liquid sample sensor and the reader can be established simply by placing the liquid sample sensor on the reader. However, measurement may have to be carried out in various environments, and thus, the liquid sample sensor set in place may float up and leave the setting location or undergo displacement due to vibration, etc., causing a break in the electrical connection. To ensure the electrical connection more reliably, an openable lid may be provided to cover the liquid sample sensor emplaced in the recess of the reader main body, or, a rotatable lever member may be provided to press and hold the emplaced liquid sample sensor. Moreover, to fulfill the same purpose, a retaining member may be provided to sandwichedly support the emplaced liquid sample sensor from the side thereof while pressing against a projection located on the first face of the liquid sample sensor.

REFERENCE SIGNS LIST 1, 4, 8: Sensor device
2, 2A, 2B, 5, 5A, 5B, 9: Liquid sample sensor
3, 6, 10: Reader
7a: Metallic film
7b: Metallic film
11, 13, 13A: First IDT electrode
12, 14, 14A: Second IDT electrode
15: First draw-out electrode
16: Second draw-out electrode
20, 50, 90: Sensor main body
20a, 50a, 90a: First face
20b, 50b, 90b: Third face
20c, 50c, 90c: Inlet
20d, 50d, 90d: Outlet
21, 21A, 51, 91: Sensor element
21a, 51a: Detection section
21b, 51b: Reference section
22, 22e, 22f, 22g, 22h, 22i, 22j: External terminal
22a: First external terminal
22b: Second external terminal
22c: Third external terminal
22d: Fourth external terminal
30, 60, 100: Reader main body
30a, 60a, 100a: Second face
30b, 100b: Inner periphery
31: Connection terminal
31a: First connection terminal
31b: Second connection terminal
31c: Third connection terminal
31d: Fourth connection terminal
32, 62, 102: Control section
52: External terminal
52a: Third external terminal
52b: Fourth external terminal
52c: Fifth external terminal
52d: Sixth external terminal
61: Connection terminal
61a: Third connection terminal
61b: Fourth connection terminal
61c: Fifth connection terminal
61d: Sixth connection terminal
92: External terminal
92a: Third external terminal
92b: Fourth external terminal
92c: Fifth external terminal
92d: Sixth external terminal
101: Connection terminal
101a: Third connection terminal
101b: Fourth connection terminal
101c: Fifth connection terminal
101d: Sixth connection terminal
220: First external terminal group
221: Second external terminal group
310: First connection terminal group
311: Second connection terminal group

The invention claimed is:

1. A sensor device, comprising:
a sensor; and
a measurement portion in which the sensor is detachably mounted,
the sensor comprising
a sensor main body comprising a first face,
a sensor element located in the sensor main body, and
a plurality of external terminals located on the first face so as to be electrically connected to the sensor element,
the measurement portion comprising
a measurement portion main body comprising a second face opposed to the first face, and
a plurality of connection terminals located on the second face,
the plurality of external terminals and the plurality of connection terminals being arranged so that at least one of a pattern of placement of the plurality of external terminals and a pattern of placement of the plurality of connection terminals exhibits rotational symmetry,
at least one of the plurality of external terminals being electrically connectable to corresponding one of the plurality of connection terminals in any one of a first arrangement in which the sensor is set in a predetermined oriented position with respect to the measurement portion and a second arrangement in which the sensor is set in another oriented position to which the sensor has been shifted, after a rotation about a rotation center of rotational symmetry, from the predetermined oriented position corresponding to the first arrangement,
wherein the plurality of external terminals comprise a first external terminal which supplies an electric signal to the detection section in the first arrangement and outputs a detection signal produced in the detection section in the second arrangement, and a second external terminal which outputs a detection signal produced in the detection section in the first arrangement and supplies an electric signal to the detection section in the second arrangement.

2. The sensor device according to claim 1,
wherein at least one of the pattern of placement of the plurality of external terminals and the pattern of placement of the plurality of connection terminals exhibits n-fold rotational symmetry, in which n represents a predetermined integer.

3. The sensor device according to claim 2,
wherein at least one of the pattern of placement of the plurality of external terminals and the pattern of placement of the plurality of connection terminals exhibits two-fold rotational symmetry.

4. The sensor device according to claim 3,
wherein the pattern of placement of the plurality of external terminals exhibits two-fold rotational symmetry, and
the sensor element comprises a detection section which produces a detection signal for detection of an object to be detected contained in a liquid sample.

5. The sensor device according to claim 4,
wherein the plurality of connection terminals comprise a first connection terminal which is electrically connected to the first external terminal in the first arrangement, and a second connection terminal which is electrically connected to the second external terminal in the first arrangement.

6. The sensor device according to claim 4,
wherein the measurement portion further comprises a control section which is electrically connected to the plurality of connection terminals and which carries out inputting and outputting electric signals,
the sensor element further comprises a reference section which produces a reference signal which serves as a reference for the detection signal, and
the control section determines whether an electric signal outputted from the sensor and inputted to the second connection terminal is a reference signal or a detection signal.

7. The sensor device according to claim 3,
wherein the pattern of placement of the plurality of connection terminals exhibits two-fold rotational symmetry,
the sensor element comprises a detection section which produces a detection signal for detection of an object to be detected contained in a liquid sample, and
the plurality of connection terminals comprise a first connection terminal which supplies an electric signal to the detection section via an external terminal of the plurality of external terminals which is electrically connected to the first connection terminal, and a second connection terminal which receives an input of a detection signal produced in the detection section via an external terminal of the plurality of external terminals which is electrically connected to the second connection terminal.

8. The sensor device according to claim 7,
wherein the measurement portion further comprises a control section which is electrically connected to the plurality of connection terminals and which carries out inputting and outputting electric signals,
the sensor element further comprises a reference section which produces a reference signal which serves as a reference for the detection signal, and
the control section determines whether an electric signal inputted to the second connection terminal is a reference signal or a detection signal.

9. The sensor device according to claim 2,
wherein at least one of the pattern of placement of the plurality of external terminals and the pattern of placement of the plurality of connection terminals exhibits four-fold rotational symmetry.

10. The sensor device according to claim 9,
wherein the pattern of placement of the plurality of external terminals exhibits four-fold rotational symmetry,
the sensor element comprises a detection section which produces a detection signal for detection of an object to be detected contained in a liquid sample upon receiving an electric signal input, and a reference section which produces a reference signal which serves as a reference for the detection signal upon receiving an electric signal input, and
the plurality of external terminals comprise a third external terminal which supplies an electric signal to the detection section, a fourth external terminal which supplies an electric signal to the reference section, a fifth external terminal which outputs a detection signal produced in the detection section, and a sixth external terminal which outputs a reference signal produced in the reference section.

11. The sensor device according to claim 10,
wherein the plurality of connection terminals comprise a third connection terminal which is electrically connected to the third external terminal in the first arrangement, a fourth connection terminal which is electrically connected to the fourth external terminal in the first arrangement, a fifth connection terminal which is electrically connected to the fifth external terminal in the first arrangement, and a sixth connection terminal which is electrically connected to the sixth external terminal in the first arrangement.

12. The sensor device according to claim 11,
wherein the measurement portion further comprises a control section which is electrically connected to the plurality of connection terminals and which carries out inputting and outputting electric signals, and
the control section determines which one of an electric signal inputted to the fifth connection terminal and an electric signal inputted to the sixth connection terminal is a reference signal or a detection signal.

13. The sensor device according to claim 9,
wherein the pattern of placement of the plurality of connection terminals exhibits four-fold rotational symmetry,
the sensor element comprises a detection section which produces a detection signal for detection of an object to be detected contained in a liquid sample upon receiving an electric signal input, and a reference section which produces a reference signal which serves as a reference for the detection signal upon receiving an electric signal input, and
the plurality of connection terminals comprise a third connection terminal which supplies an electric signal to the detection section via an external terminal of the plurality of external terminals which is electrically connected to the third connection terminal, a fourth connection terminal which supplies an electric signal to the reference section via an external terminal of the plurality of external terminals which is electrically connected to the fourth connection terminal, a fifth connection terminal which receives an input of a detection signal produced in the detection section via an external terminal of the plurality of external terminals which is electrically connected to the fifth connection terminal, and a sixth connection terminal which receives an input of a reference signal produced in the reference section via an external terminal of the plurality of external terminals which is electrically connected to the sixth connection terminal.

14. The sensor device according to claim 2,
wherein the sensor element comprises a detection section which produces a detection signal for detection of an object to be detected contained in a liquid sample upon receiving an electric signal input,
the plurality of external terminals comprise a seventh external terminal which supplies an electric signal to the detection section, and an eighth external terminal which outputs a detection signal produced in the detection section, and
the seventh external terminal and the eighth external terminal are shaped in concentrically arranged rings whose centers coincide with the rotation center.

15. The sensor device according to claim 14,
wherein the plurality of connection terminals comprise a seventh connection terminal which is electrically connected to the seventh external terminal in the first arrangement, and an eighth connection terminal which is electrically connected to the eighth external terminal in the first arrangement.

16. The sensor device according to claim 15,
wherein the sensor element further comprises a reference section which produces a reference signal which serves as a reference for the detection signal,
the plurality of external terminals comprise a ninth external terminal which supplies an electric signal to the reference section, and a tenth external terminal which outputs a reference signal produced in the reference section, and
the ninth external terminal and the tenth external terminal are shaped in concentrically arranged rings whose centers coincide with the rotation center.

17. The sensor device according to claim 2,
wherein the sensor element comprises a detection section which produces a detection signal for detection of an object to be detected contained in a liquid sample upon receiving an electric signal input,
the plurality of connection terminals comprise a seventh connection terminal which supplies an electric signal to the detection section via an external terminal of the plurality of external terminals which is electrically connected to the seventh connection terminal, and an eighth connection terminal which receives an input of a detection signal produced in the detection section via an external terminal of the plurality of external terminals which is electrically connected to the eighth connection terminal, and
the seventh connection terminal and the eighth connection terminal are shaped in concentrically arranged rings whose centers coincide with the rotation center.

18. The sensor device according to claim 17,
wherein the sensor element further comprises a reference section which produces a reference signal which serves as a reference for the detection signal,
the plurality of connection terminals comprise a ninth connection terminal which supplies an electric signal to the detection section via an external terminal of the plurality of external terminals which is electrically connected to the ninth connection terminal, and a tenth connection terminal which receives an input of a reference signal produced in the reference section via an external terminal of the plurality of external terminals which is electrically connected to the tenth connection terminal, and
the ninth connection terminal and the tenth connection terminal are shaped in concentrically arranged rings whose centers coincide with the rotation center.

19. A detecting method which is carried out by a sensor device comprising a sensor and a measurement portion in which the sensor is detachably mounted, comprising:
a first step of setting a first face of the sensor on a second face of the measurement portion for supporting the first face;
a second step of supplying an electric signal to a sensor element under conditions where at least one of a pattern of placement of connection terminals located on the second face and a pattern of placement of external terminals located on the first face so as to be electrically connected to the corresponding connection terminals exhibits rotational symmetry, and electrical connection is established between the connection terminals and the external terminals, wherein the external terminals comprise a first external terminal which supplies the electric signal to a detection section in a first rotational position and outputs a detection signal produced in the detection section in a second rotational position, and a second external terminal which outputs a detection signal produced in the detection section in the first rotational position and supplies the electric signal to the detection section in the second rotational position;
a third step of inputting a detection signal produced in the sensor element in response to the supplied electric signal, via an external terminal disposed on the first face, to a connection terminal disposed on the second face so as to be electrically connected to the external terminal; and
a fourth step of outputting a detection result based on the inputted detection signal,
the second step, the third step, and the fourth step being performed continuously, during which a liquid sample is supplied to the sensor element of the sensor.

20. The detecting method according to claim 19,
wherein, in the third step, a reference signal produced in the sensor element in response to the supplied electric signal is further inputted to a connection terminal,
between the third step and the fourth step, the method further comprising a determination step of determining which one of electric signals inputted to the connection terminals is a detection signal or a reference signal, and
in the fourth step, the detection result is outputted based on a result of determination as to which one of the inputted electric signals is a detection signal or a reference signal.

* * * * *